(12) United States Patent
Wu

(10) Patent No.: US 12,488,102 B2
(45) Date of Patent: Dec. 2, 2025

(54) METHOD FOR PROCESSING TRAFFIC IN PROTECTION DEVICE, AND PROTECTION DEVICE

(71) Applicant: Huawei Technologies Co., Ltd., Shenzhen (CN)

(72) Inventor: Bo Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 18/356,619

(22) Filed: Jul. 21, 2023

(65) Prior Publication Data

US 2023/0367875 A1 Nov. 16, 2023

Related U.S. Application Data

(63) Continuation of application No. PCT/CN2021/124456, filed on Oct. 18, 2021.

(30) Foreign Application Priority Data

Jan. 22, 2021 (CN) .......................... 202110089446.6

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 6,445,709 B1 * | 9/2002 | Chiang | ............... | H04L 12/467 709/236 |
| 6,567,400 B1 * | 5/2003 | Zhang | ................. | H04L 12/66 370/429 |
| 8,893,267 B1 * | 11/2014 | Sathe | .................. | G06F 21/554 711/163 |
| 2002/0116527 A1 * | 8/2002 | Chen | .................... | H04L 45/742 709/245 |
| 2003/0067928 A1 * | 4/2003 | Gonda | ............... | H04L 12/4641 370/401 |
| 2003/0110344 A1 * | 6/2003 | Szczepanek | ........ | H04L 12/4625 709/200 |
| 2003/0169155 A1 * | 9/2003 | Mollenkopf | ............. | H04B 3/54 340/288 |
| 2003/0172291 A1 * | 9/2003 | Judge | .................. | H04L 63/0236 726/1 |
| 2004/0054813 A1 * | 3/2004 | Boucher | ................ | H04L 69/12 709/250 |
| 2005/0138276 A1 * | 6/2005 | Navada | ............... | G06F 13/1647 711/105 |
| 2007/0165648 A1 * | 7/2007 | Joo | .......................... | H04L 45/00 370/395.54 |
| 2008/0170567 A1 * | 7/2008 | Joo | .......................... | H04L 45/04 370/389 |
| 2009/0316700 A1 * | 12/2009 | White | .................... | H04L 45/742 370/392 |
| 2010/0061229 A1 * | 3/2010 | Maisch | ................. | H04L 49/552 370/222 |
| 2016/0036838 A1 | 2/2016 | Jain et al. | | |
| 2016/0373304 A1 * | 12/2016 | Sharma | ................. | H04L 63/101 |
| 2019/0007449 A1 * | 1/2019 | Le Merrer | .......... | H04L 63/1425 |
| 2022/0239676 A1 * | 7/2022 | Demopoulos | ....... | H04L 63/1416 |
| 2023/0021517 A1 * | 1/2023 | Jiang | ..................... | H04L 61/103 |

FOREIGN PATENT DOCUMENTS

| | | |
|---|---|---|
| CN | 105207997 B | 11/2018 |
| CN | 109246057 A | 1/2019 |

\* cited by examiner

*Primary Examiner* — Kaveh Abrishamkar
(74) *Attorney, Agent, or Firm* — Slater Matsil, LLP

(57) ABSTRACT

In accordance with an embodiment, a method includes: receiving, by a dedicated security chip, first traffic from a first network interface of the protection device, where the first network interface is configured to receive traffic sent by a first network device, and a destination internet protocol (IP) address of the first traffic comprises a first IP address; determining, by the dedicated security chip, whether the first IP address exists in a first destination IP table stored on the dedicated security chip, wherein the first destination IP table comprises at least one IP address having a risk of being attacked; and in response to a determination that the first IP address exists in the first destination IP table, sending, by the dedicated security chip, the first traffic to the CPU.

20 Claims, 15 Drawing Sheets

METHOD FOR PROCESSING TRAFFIC IN PROTECTION DEVICE, AND PROTECTION DEVICE

CROSS-REFERENCE TO RELATED APPLICATIONS

This application is a continuation of International Application No. PCT/CN2021/124456, filed on Oct. 18, 2021, which claims priority to Chinese Patent Application No. 202110089446.6, filed on Jan. 22, 2021. The disclosures of the aforementioned applications are hereby incorporated by reference in their entireties.

TECHNICAL FIELD

This application relates to the field of network technologies, and in particular, to a method for processing traffic in a protection device, and the protection device.

BACKGROUND

A protection device (for example, a security gateway or a firewall) detects traffic passing through the protection device, to determine whether there is potential attacks against a network, and timely blocks the attacks in case of occurrence, to ensure network security.

In some researches, a dedicated security chip is used, to try to improve attack defense performance of a protection device. Specifically, some defense means with fixed logic or simple logic, for example, first packet discarding and a rate limiting function, are implemented on the dedicated security chip.

However, the foregoing method is subject to a capability of the dedicated security chip, and therefore, effectiveness and integrity of defense are reduced.

SUMMARY

Embodiments of this application provide a method for processing traffic in a protection device, and the protection device, to improve effectiveness and integrity of defense. The technical solutions are as follows.

According to a first aspect, a method for processing traffic in a protection device is provided, where the protection device includes a central processing unit (CPU) and a dedicated security chip. The method includes: The dedicated security chip receives first traffic from a first network interface of the protection device, where the first network interface is configured to receive traffic sent by a first network device, and a destination IP address of the first traffic includes a first internet protocol (IP) address; the dedicated security chip determines whether the first IP address exists in a first destination IP table stored on the dedicated security chip, where the first destination IP table includes at least one IP address having a risk of being attacked; and if the first IP address exists in the first destination IP table, the dedicated security chip sends the first traffic to the CPU.

Sometimes, the foregoing IP address having a risk of being attacked may alternatively be referred to as an IP address with relatively high risks. The foregoing IP address having a risk of being attacked includes but is not limited to an attacked IP address or a specified protected IP address. The attacked IP address is an IP address that has been attacked by attackers. For example, duration in which a rate of data destined for the attacked IP address is higher than a threshold is longer than specific duration. The specified protected IP address includes but is not limited to an IP address configured by a network administrator, for example, an IP address of a server in a local area network, a previously attacked IP address, a vulnerable IP address, an IP address on which a suspicious event previously occurred, and the like.

In the method provided in the first aspect, the dedicated security chip is combined with the CPU, to collaboratively defend against attacks. The dedicated security chip sends, to the CPU, traffic whose destination IP address is included in a table (the first destination IP address table) of risky IP addresses, so that the CPU further defends against traffic having an attack risk. This helps resolve a problem that exists when only a dedicated security chip or only a CPU is used for attack defense, helps to improve effectiveness and integrity of defense, and helps implement comprehensive attack detection and defense during forwarding processing.

In some embodiments, the method further includes: If the first IP address does not exist in the first destination IP table, the dedicated security chip sends the first traffic to a second network interface of the protection device, so that the second network interface forwards the first traffic to a second network device.

In the foregoing implementation, normal traffic is directly forwarded by the dedicated security chip instead of being sent to the CPU. Therefore, burden of the CPU for forwarding normal traffic is reduced, and traffic destined for an IP address having no risk of being attacked is not affected when the CPU rushes high. In addition, high-performance hardware of the dedicated security chip can be used to implement fast traffic forwarding, improving overall forwarding performance of the protection device.

In some embodiments, if the first IP address does not exist in the first destination IP table, the method further includes: The dedicated security chip samples the first traffic to obtain sampled packets; and the dedicated security chip sends the sampled packets to the CPU.

In the foregoing implementation, the dedicated security chip samples traffic and sends the sampled traffic to the CPU, to help the CPU monitor traffic in real time by using sampled packets. This helps detect, in a more timely manner, whether the traffic is in an attack state. In addition, normal forwarding of the traffic is not affected.

In some embodiments, that the dedicated security chip samples the first traffic to obtain sampled packets includes: The dedicated security chip selects the sampled packets from the first traffic based on a sampling ratio, where the sampling ratio indicates a ratio of a quantity of packets included in the first traffic to a quantity of the sampled packets.

In the foregoing implementation, the dedicated security chip sends the sampled packets based on the sampling ratio. Therefore, it is convenient for the CPU to accurately collect statistics on a packet rate based on the sampling ratio. In addition, a quantity of packets sent to the CPU is reduced, thereby helping reduce load of the CPU.

In some embodiments, after the dedicated security chip sends the sampled packets to the CPU, the method further includes: The dedicated security chip receives a first addition message from the CPU, where the first addition message includes the first IP address, and the first addition message indicates to add the first IP address to the first destination IP table; and the dedicated security chip adds the first IP address to the first destination IP table.

In the foregoing implementation, the dedicated security chip adds the IP address to the destination IP table based on the message delivered by the CPU. This helps supplement a newly emerging IP having a risk of being attacked to the destination IP table in a timely manner, so that the destination IP table can be self-updated.

In some embodiments, after the dedicated security chip sends the first traffic to the CPU, the method further includes: The dedicated security chip receives a first deletion message from the CPU, where the first deletion message indicates to delete the first IP address from the first destination IP table; and the dedicated security chip deletes the first IP address from the first destination IP table.

In the foregoing implementation, the dedicated security chip deletes the IP address from the destination IP table based on the message delivered by the CPU. This helps clear an IP on which an attack ends from the destination IP table in a timely manner, so that the destination IP table can be self-updated.

In some embodiments, the method further includes: If the first destination IP address does not exist in the first destination IP table, the dedicated security chip determines whether the first IP address exists in a second destination IP table stored on the dedicated security chip, where the second destination IP table includes at least one IP address having no risk of being attacked; and if the first IP address exists in the second destination IP table, the dedicated security chip sends the first traffic to a second network interface of the protection device, so that the second network interface forwards the first traffic to a second network device; or if the first IP address does not exist in the second destination IP table, the dedicated security chip sends the first traffic to the CPU.

In the foregoing implementation, the destination IP address is used to preferentially match an IP address having a risk of being attacked, and when no IP address having a risk of being attacked is matched, the destination IP address is further used to match an IP address having no risk of being attacked, to improve accuracy of traffic distribution control while ensuring that traffic of the IP address having a risk of being attacked is sent to the CPU.

In some embodiments, the dedicated security chip includes at least one of an application-specific integrated circuit (ASIC), a field-programmable gate array (FPGA), or a network processor (NP).

The foregoing provides a plurality of possible implementations of the dedicated security chip, to improve availability of the solution.

According to a second aspect, a method for processing traffic in a protection device is provided, where the protection device includes a central processing unit CPU and a dedicated security chip. The method includes: The dedicated security chip receives first traffic from a first network interface of the protection device, where the first network interface is configured to receive traffic sent by a first network device, and a destination IP address of the first traffic includes a first IP address; the dedicated security chip determines whether the first IP address exists in a second destination IP table stored on the dedicated security chip, where the second destination IP table includes at least one IP address having no risk of being attacked; and if the first IP address does not exist in the second destination IP table, the dedicated security chip sends the first traffic to the CPU.

Sometimes, the foregoing IP address having no risk of being attacked may alternatively be referred to as a relatively low-risk IP address. The IP address having no risk of being attacked includes but is not limited to an unattacked IP address or an IP address that is not specified to be protected. The unattacked IP address is an IP address that has not been attacked by an attacker.

In the method provided in the second aspect, the dedicated security chip is combined with the CPU, and the dedicated security chip sends, to the CPU, traffic whose destination IP address is not in a table (the second destination IP address table) of IP addresses having no risk of being attacked, so that the CPU further defends against traffic having an attack risk. This helps resolve a problem that exists when only a dedicated security chip or only a CPU is used for attack defense. Therefore, effectiveness and integrity of defense are improved.

In some embodiments, the method further includes: If the first IP address exists in the second destination IP table, the dedicated security chip sends the first traffic to a second network interface of the protection device, so that the second network interface forwards the first traffic to a second network device.

In the foregoing implementation, normal traffic (that is, traffic whose destination IP address is an IP address having no risk of being attacked) is directly forwarded by the dedicated security chip instead of being sent to the CPU. Therefore, forwarding burden of the CPU on normal traffic is reduced, and traffic destined for an IP address having no risk of being attacked is not affected when the CPU rushes high. In addition, high-performance hardware of the dedicated security chip can be used to implement fast traffic forwarding, improving overall forwarding performance of the protection device.

In some embodiments, if the first IP address exists in the second destination IP table, the method further includes: The dedicated security chip samples the first traffic to obtain sampled packets; and the dedicated security chip sends the sampled packets to the CPU.

In the foregoing implementation, the dedicated security chip samples traffic and sends the sampled traffic to the CPU, to help the CPU monitor traffic in real time by using sampled packets. This helps detect, in a more timely manner, whether the traffic is in an attack state. In addition, normal forwarding of the traffic is not affected.

In some embodiments, after the dedicated security chip sends the sampled packets to the CPU, the method further includes: The dedicated security chip receives a second deletion message from the CPU, where the second deletion message indicates to delete the first IP address from the second destination IP table.

The dedicated security chip deletes the first IP address from the second destination IP table.

In the foregoing implementation, the dedicated security chip deletes the IP address from the destination IP table based on the message delivered by the CPU. This helps clear a newly emerging IP having a risk of being attacked from the destination IP table in a timely manner, so that the destination IP table can be self-updated.

In some embodiments, after the dedicated security chip sends the first traffic to the CPU, the method further includes: The dedicated security chip receives a second addition message from the CPU, where the second addition message includes the first IP address, and the second addition message indicates to add the first IP address to the second destination IP table; and the dedicated security chip adds the first IP address to the second destination IP table.

In the foregoing implementation, the dedicated security chip adds the IP address to the destination IP table based on the message delivered by the CPU. This helps supplement an IP on which an attack ends to the destination IP table in a timely manner, so that the destination IP table can be self-updated.

According to a third aspect, a method for processing traffic in a protection device is provided, where the protection device includes a central processing unit CPU and a dedicated security chip. The method includes: The CPU receives first traffic from the dedicated security chip; the CPU determines, based on the first traffic, a rate of data destined for a first IP address; if duration in which the rate meets a threshold condition is greater than first duration, the CPU generates an addition message, where the addition message includes the first IP address, and the addition message indicates to add the first IP address to a destination IP table stored on the dedicated security chip; and the CPU sends the addition message to the dedicated security chip.

In the method provided in the third aspect, after finding, based on a rate statistics mechanism, whether a destination IP address is attacked, the CPU delivers a message to the dedicated security chip, to indicate the dedicated security chip to add the IP address to the destination IP table. In this way, a new IP address having a risk of being attacked or an IP address on which an attack ends is automatically added to the destination IP table. In this way, the destination IP table can be self-updated, and is dynamically updated based on new malicious traffic in an actual network environment in which the protection device is located, so that network adaptability and an update effect are improved.

In some embodiments, that the rate meets the threshold condition includes: The rate exceeds a first threshold; the destination IP table includes a first destination IP table, where the first destination IP table includes at least one IP address having a risk of being attacked; and the addition message includes a first addition message, where the first addition message indicates to add the first IP address to the first destination IP table.

The foregoing implementation helps supplement a newly emerging IP address having a risk of being attacked to the destination IP table in a timely manner, so that the destination IP table is more complete, and efficiency of updating the destination IP table is improved.

In some embodiments, after the CPU sends the first addition message to the dedicated security chip, the method further includes: If duration in which the rate does not meet the threshold condition is greater than second duration, the CPU generates a first deletion message, where the first deletion message indicates to delete the first IP address from the first destination IP table; and the CPU sends the first deletion message to the dedicated security chip.

In some embodiments, that the rate meets the threshold condition includes: The rate is lower than a second threshold; the destination IP table includes a second destination IP table, where the second destination IP table includes at least one IP address having no risk of being attacked; and the addition message includes a second addition message, where the second addition message indicates to add the first IP address to the second destination IP table.

The foregoing implementation helps delete an IP address on which an attack ends from the destination IP table in a timely manner, so that the destination IP table is more complete, and efficiency of updating the destination IP table is improved.

In some embodiments, after the CPU sends the second addition message to the dedicated security chip, the method further includes: If duration in which the rate does not meet the threshold condition is greater than second duration, the CPU generates a second deletion message, where the second deletion message indicates to delete the first IP address from the second destination IP table; and the CPU sends the second deletion message to the dedicated security chip.

The foregoing implementation helps delete a newly emerging IP having a risk of being attacked from the destination IP table in a timely manner, so that the destination IP table is more complete, and efficiency of updating the destination IP table is improved.

In some embodiments, the traffic from the dedicated security chip includes sampled packets, and that the CPU determines, based on the first traffic, a rate of data destined for a first IP address includes: The CPU determines, based on a rate at which the sampled packets are received and a sampling ratio, the rate of the data destined for the first IP address, where the sampling ratio indicates a ratio of a quantity of packets included in the first traffic to a quantity of the sampled packets, and the rate is a product of the rate at which the sampled packets are received and the sampling ratio.

In the foregoing implementation, the CPU collects statistics on the packet rate based on the sampling ratio used when the dedicated security chip performs sampling. Therefore, load of the CPU can be reduced without affecting accuracy of the collected rate.

In some embodiments, the first IP address is a destination IP address of a packet in the first traffic; or the first IP address is an IP address in the destination IP table.

According to a fourth aspect, a method for processing traffic in a protection device is provided, where the protection device includes a central processing unit CPU and a dedicated security chip. The method includes: The dedicated security chip receives first traffic from a first network interface of the protection device, where the first network interface is configured to receive traffic sent by a first network device, and a source IP address of the first traffic includes a first IP address; the dedicated security chip determines whether the first IP address exists in a first source IP table stored on the dedicated security chip, where the first source IP table includes at least one IP address having a risk of being attacked; and if the first IP address exists in the first source IP table, the dedicated security chip sends the first traffic to the CPU.

In the method provided in the fourth aspect, the dedicated security chip is combined with the CPU, and the dedicated security chip sends, to the CPU, traffic whose source IP address is in a table (the first source IP address table) of IP addresses having a risk of being attacked, so that the CPU further defends against attack traffic. This helps resolve a problem that exists when only a dedicated security chip or only a CPU is used for attack defense. Therefore, effectiveness and integrity of defense are improved.

Further, the method provided in the fourth aspect better matches a scenario in which an attacker initiates an attack from a local area network. This helps protect a host in the local area network from being used by the attacker to spread a threat.

In some embodiments, the method further includes: If the first IP address does not exist in the first source IP table, the dedicated security chip sends the first traffic to a second network interface of the protection device, so that the second network interface forwards the first traffic to a second network device.

In the foregoing implementation, normal traffic is directly forwarded by the dedicated security chip instead of being sent to the CPU. Therefore, forwarding burden of the CPU on normal traffic is reduced, and traffic destined for an IP address having no risk of being attacked is not affected when the CPU rushes high. In addition, high-performance hardware of the dedicated security chip can be used to implement fast traffic forwarding, improving overall forwarding performance of the protection device.

In some embodiments, if the first IP address does not exist in the first source IP table, the method further includes: The dedicated security chip samples the first traffic to obtain sampled packets; and the dedicated security chip sends the sampled packets to the CPU.

In some embodiments, that the dedicated security chip samples the first traffic to obtain sampled packets includes the following.

The dedicated security chip selects the sampled packets from the first traffic based on a sampling ratio, where the sampling ratio indicates a ratio of a quantity of packets included in the first traffic to a quantity of the sampled packets.

In some embodiments, after the dedicated security chip sends the sampled packets to the CPU, the method further includes: The dedicated security chip receives a first addition message from the CPU, where the first addition message includes the first IP address, and the first addition message indicates to add the first IP address to the first source IP table; and the dedicated security chip adds the first IP address to the first source IP table.

In some embodiments, after the dedicated security chip sends the first traffic to the CPU, the method further includes: The dedicated security chip receives a first deletion message from the CPU, where the first deletion message indicates to delete the first IP address from the first source IP table; and the dedicated security chip deletes the first IP address from the first source IP table.

In some embodiments, the method further includes: If the first destination IP address does not exist in the first source IP table, the dedicated security chip determines whether the first IP address exists in a second source IP table stored on the dedicated security chip, where the second source IP table includes at least one IP address having no risk of being attacked; and if the first IP address exists in the second source IP table, the dedicated security chip sends the first traffic to a second network interface of the protection device, so that the second network interface forwards the first traffic to a second network device; or if the first IP address does not exist in the second source IP table, the dedicated security chip sends the first traffic to the CPU.

In some embodiments, the dedicated security chip includes at least one of an ASIC, an FPGA, or an NP.

According to a fifth aspect, a method for processing traffic in a protection device is provided, where the protection device includes a central processing unit CPU and a dedicated security chip. The method includes: The dedicated security chip receives first traffic from a first network interface of the protection device, where the first network interface is configured to receive traffic sent by a first network device, and a source IP address of the first traffic includes a first IP address; the dedicated security chip determines whether the first IP address exists in a second source IP table stored on the dedicated security chip, where the second source IP table includes at least one IP address having no risk of being attacked; and if the first IP address does not exist in the second source IP table, the dedicated security chip sends the first traffic to the CPU.

In the method provided in the fifth aspect, the dedicated security chip is combined with the CPU, and the dedicated security chip sends, to the CPU, traffic whose source IP address is not in a table (the second source IP address table) of IP addresses having no risk of being attacked, so that the CPU further defends against attack traffic. This helps resolve a problem that exists when only a dedicated security chip or only a CPU is used for attack defense. Therefore, effectiveness and integrity of defense are improved.

In some embodiments, the method further includes: If the first IP address exists in the second source IP table, the dedicated security chip sends the first traffic to a second network interface of the protection device, so that the second network interface forwards the first traffic to a second network device.

In some embodiments, if the first IP address exists in the second source IP table, the method further includes: The dedicated security chip samples the first traffic to obtain sampled packets; and the dedicated security chip sends the sampled packets to the CPU.

In some embodiments, after the dedicated security chip sends the sampled packets to the CPU, the method further includes: The dedicated security chip receives a second deletion message from the CPU, where the second deletion message indicates to delete the first IP address from the second source IP table; and the dedicated security chip deletes the first IP address from the second source IP table.

In some embodiments, after the dedicated security chip sends the first traffic to the CPU, the method further includes: The dedicated security chip receives a second addition message from the CPU, where the second addition message includes the first IP address, and the second addition message indicates to add the first IP address to the second source IP table; and the dedicated security chip adds the first IP address to the second source IP table.

According to a sixth aspect, a method for processing traffic in a protection device is provided, where the protection device includes a central processing unit CPU and a dedicated security chip. The method includes: The CPU receives first traffic from the dedicated security chip; the CPU determines, based on the first traffic, a rate of data coming from a first IP address; if duration in which the rate meets a threshold condition is greater than first duration, the CPU generates an addition message, where the addition message includes the first IP address, and the addition message indicates to add the first IP address to a source IP table stored on the dedicated security chip; and the CPU sends the addition message to the dedicated security chip.

In the method provided in the sixth aspect, after finding, based on a rate statistics mechanism, whether a source IP address is attacked, the CPU delivers a message to the dedicated security chip, to indicate the dedicated security chip to add the IP address to the source IP table. In this way, a new IP address having a risk of being attacked or an IP address that was attacked is automatically added to the source IP table. In this way, the source IP table can be self-updated, and is dynamically updated based on new malicious traffic in an actual network environment in which the protection device is located, so that network adaptability and an update effect are improved.

In some embodiments, that the rate meets the threshold condition includes: The rate exceeds a first threshold; the source IP table includes a first source IP table, where the first source IP table includes at least one IP address having a risk of being attacked; and the addition message includes a first addition message, where the first addition message indicates to add the first IP address to the first source IP table.

In some embodiments, after the CPU sends the first addition message to the dedicated security chip, the method further includes: If duration in which the rate does not meet the threshold condition is greater than second duration, the CPU generates a first deletion message, where the first deletion message indicates to delete the first IP address from the first source IP table; and the CPU sends the first deletion message to the dedicated security chip.

In some embodiments, that the rate meets the threshold condition includes: The rate is lower than a second threshold; the source IP table includes a second source IP table, where the second source IP table includes at least one IP address having no risk of being attacked; and the addition message includes a second addition message, where the second addition message indicates to add the first IP address to the second source IP table.

In some embodiments, after the CPU sends the second addition message to the dedicated security chip, the method further includes: If duration in which the rate does not meet the threshold condition is greater than second duration, the CPU generates a second deletion message, where the second deletion message indicates to delete the first IP address from the second source IP table; and the CPU sends the second deletion message to the dedicated security chip.

In some embodiments, the traffic from the dedicated security chip includes sampled packets, and that the CPU determines, based on the first traffic, a rate of data coming from a first IP address includes: The CPU determines, based on a rate at which the sampled packets are received and a sampling ratio, the rate of the data coming from the first IP address, where the sampling ratio indicates a ratio of a quantity of packets included in the first traffic to a quantity of the sampled packets, and the rate is a product of the rate at which the sampled packets are received and the sampling ratio.

In some embodiments, the first IP address is a source IP address of a packet in the first traffic; or the first IP address is an IP address in the source IP table.

According to a seventh aspect, an embodiment of this application provides a chip, including a memory and a processor. The memory is configured to store computer instructions, and the processor is configured to invoke the computer instructions from the memory and run the computer instructions, to perform the method in any one of the first aspect and the possible implementations of the first aspect.

According to an eighth aspect, an embodiment of this application provides a chip, including a memory and a processor. The memory is configured to store computer instructions, and the processor is configured to invoke the computer instructions from the memory and run the computer instructions, to perform the method according to any one of the second aspect and the possible implementations of the second aspect.

According to a ninth aspect, a CPU is provided. The CPU is configured to perform the method in any one of the third aspect or the optional manners of the third aspect. For details, refer to the foregoing detailed descriptions. Details are not described herein again.

According to a tenth aspect, an embodiment of this application provides a chip, including a memory and a processor. The memory is configured to store computer instructions, and the processor is configured to invoke the computer instructions from the memory and run the computer instructions, to perform the method according to any one of the fourth aspect and the possible implementations of the fourth aspect.

According to an eleventh aspect, an embodiment of this application provides a chip, including a memory and a processor. The memory is configured to store computer instructions, and the processor is configured to invoke the computer instructions from the memory and run the computer instructions, to perform the method according to any one of the fifth aspect and the possible implementations of the fifth aspect.

According to a twelfth aspect, a CPU is provided. The CPU is configured to perform the method in any one of the sixth aspect or the optional manners of the sixth aspect. For details, refer to the foregoing detailed descriptions. Details are not described herein again.

According to a thirteenth aspect, a protection device is provided. The protection device includes the dedicated security chip according to any one of the seventh aspect or the optional manners of the seventh aspect, the CPU according to any one of the ninth aspect or the optional manners of the ninth aspect, and at least one network interface.

According to a fourteenth aspect, a protection device is provided. The protection device includes the dedicated security chip according to any one of the eighth aspect or the optional manners of the eighth aspect, the CPU according to any one of the ninth aspect or the optional manners of the ninth aspect, and at least one network interface.

According to a fifteenth aspect, a protection device is provided. The protection device includes the dedicated security chip according to any one of the tenth aspect or the optional manners of the tenth aspect, the CPU according to any one of the twelfth aspect or the optional manners of the twelfth aspect, and at least one network interface.

According to a sixteenth aspect, a protection device is provided. The protection device includes the dedicated security chip according to any one of the eleventh aspect or the optional manners of the eleventh aspect, the CPU according to any one of the twelfth aspect or the optional manners of the twelfth aspect, and at least one network interface.

According to a seventeenth aspect, a protection system is provided. The protection system includes the dedicated security chip according to any one of the seventh aspect or the optional manners of the seventh aspect, the CPU according to any one of the ninth aspect or the optional manners of the ninth aspect, and at least one network interface. Optionally, at least two of the dedicated security chip, the CPU, and the at least one network interface in the protection system provided in the seventeenth aspect are distributed on different physical computers.

According to an eighteenth aspect, a protection system is provided. The protection system includes the dedicated security chip according to any one of the eighth aspect or the optional manners of the eighth aspect, the CPU according to any one of the ninth aspect or the optional manners of the ninth aspect, and at least one network interface. Optionally, at least two of the dedicated security chip, the CPU, and the at least one network interface in the protection system provided in the eighteenth aspect are distributed on different physical computers.

According to a nineteenth aspect, a protection system is provided. The protection system includes the dedicated security chip according to any one of the tenth aspect or the optional manners of the tenth aspect, the CPU according to any one of the twelfth aspect or the optional manners of the twelfth aspect, and at least one network interface. Optionally, at least two of the dedicated security chip, the CPU, and the at least one network interface in the protection system provided in the nineteenth aspect are distributed on different physical computers.

According to a twentieth aspect, a protection system is provided. The protection system includes the dedicated security chip according to any one of the eleventh aspect or the optional manners of the eleventh aspect, the CPU according to any one of the twelfth aspect or the optional manners of the twelfth aspect, and at least one network interface. Optionally, at least two of the dedicated security chip, the CPU, and the at least one network interface in the protection system provided in the twentieth aspect are distributed on different physical computers.

According to a twenty-first aspect, a computer program product is provided. The computer program product includes one or more computer program instructions. When the computer program instructions are loaded and run by a dedicated security chip, the dedicated security chip is enabled to perform the method provided in any one of the first aspect or the optional manners of the first aspect.

According to a twenty-second aspect, a computer program product is provided. The computer program product includes one or more computer program instructions. When the computer program instructions are loaded and run by a dedicated security chip, the dedicated security chip is enabled to perform the method provided in any one of the second aspect or the optional manners of the second aspect.

According to a twenty-third aspect, a computer program product is provided. The computer program product includes one or more computer program instructions. When the computer program instructions are loaded and run by a CPU, the CPU is enabled to perform the method provided in any one of the third aspect or the optional manners of the third aspect.

According to a twenty-fourth aspect, a computer program product is provided. The computer program product includes one or more computer program instructions. When the computer program instructions are loaded and run by a dedicated security chip, the dedicated security chip is enabled to perform the method provided in any one of the fourth aspect or the optional manners of the fourth aspect.

According to a twenty-fifth aspect, a computer program product is provided. The computer program product includes one or more computer program instructions. When the computer program instructions are loaded and run by a dedicated security chip, the dedicated security chip is enabled to perform the method provided in any one of the fifth aspect or the optional manners of the fifth aspect.

According to a twenty-sixth aspect, a computer program product is provided. The computer program product includes one or more computer program instructions. When the computer program instructions are loaded and run by a CPU, the CPU is enabled to perform the method provided in any one of the sixth aspect or the optional manners of the sixth aspect.

According to a twenty-seventh aspect, a computer-readable storage medium is provided. The storage medium stores at least one instruction. When the at least one instruction is run on a dedicated security chip, the dedicated security chip is enabled to perform the method provided in any one of the first aspect or the optional manners of the first aspect.

According to a twenty-eighth aspect, a computer-readable storage medium is provided. The storage medium stores at least one instruction. When the at least one instruction is run on a dedicated security chip, the dedicated security chip is enabled to perform the method provided in any one of the second aspect or the optional manners of the second aspect.

According to a twenty-ninth aspect, a computer-readable storage medium is provided. The storage medium stores at least one instruction. When the at least one instruction is run on a CPU, the CPU is enabled to perform the method provided in any one of the third aspect or the optional manners of the third aspect.

According to a thirtieth aspect, a computer-readable storage medium is provided. The storage medium stores at least one instruction. When the at least one instruction is run on a dedicated security chip, the dedicated security chip is enabled to perform the method provided in any one of the fourth aspect or the optional manners of the fourth aspect.

According to a thirty-first aspect, a computer-readable storage medium is provided. The storage medium stores at least one instruction. When the at least one instruction is run on a dedicated security chip, the dedicated security chip is enabled to perform the method provided in any one of the fifth aspect or the optional manners of the fifth aspect.

According to a thirty-second aspect, a computer-readable storage medium is provided. The storage medium stores at least one instruction. When the at least one instruction is run on a CPU, the CPU is enabled to perform the method provided in any one of the sixth aspect or the optional manners of the sixth aspect.

DETAILED DESCRIPTION OF ILLUSTRATIVE EMBODIMENTS

Figure 1:
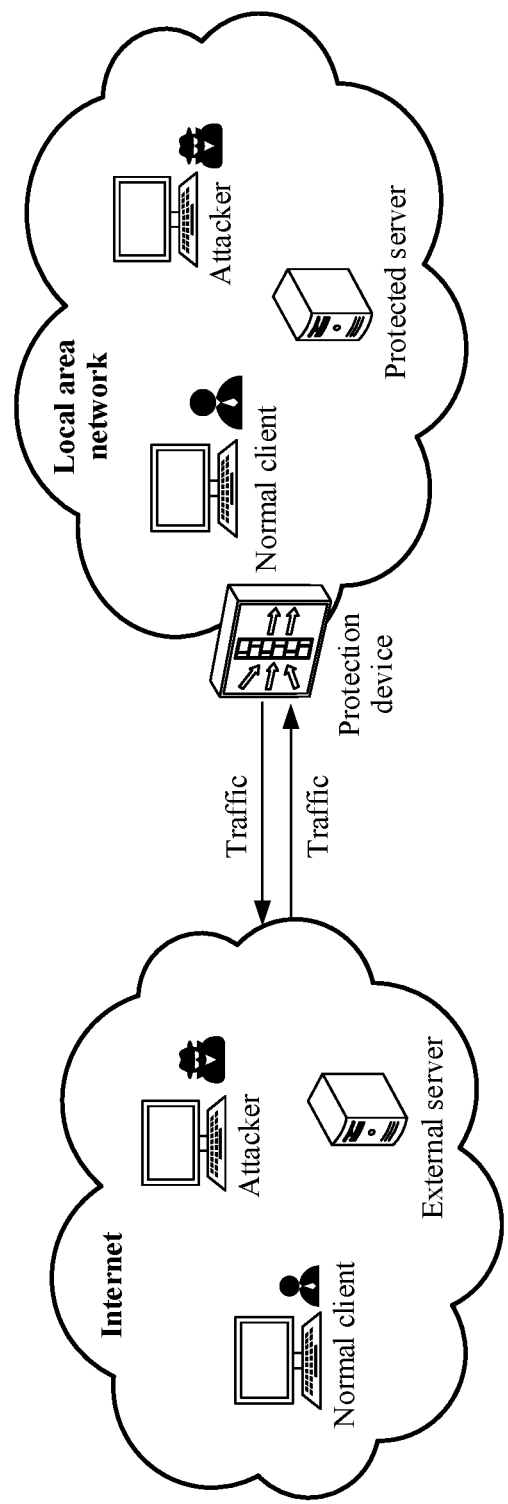
FIG. 1 is a schematic diagram of an application scenario according to an embodiment of this application.

To make the objectives, technical solutions, and advantages of this application clearer, the following further describes the implementations of this application in detail with reference to the accompanying drawings.

In a distributed denial-of-service (distributed denial-of-service attack, DDoS) attack, an attacker controls a large quantity of zombie hosts in a zombie network to send a large amount of data to an attacked target, to exhaust system resources of the attacked target. Consequently, the attacked target cannot respond to a normal service request. With development of the 5th generation mobile communication technology (5th generation mobile networks, 5G), traffic of the DDoS attack is increasing. Peak traffic of a single attack may reach a terabyte (TB) level. This poses an increasingly higher requirement on performance of a DDoS protection device. In addition, the protection device is prone to a single point of failure. If a usage rate of a central processing unit (CPU) of the protection device surges, all services passing through the device are affected.

In some researches, a dedicated security chip technology is used to improve DDoS defense performance. Some simple defense means with fixed logic, such as first-packet discarding and a rate limiting function, are implemented on hardware. However, in this manner, due to a limited capability of a dedicated security chip, some application layers or complex DDoS defense means, for example, a verification code technology in hypertext transfer protocol (HTTP) defense, a redirection technology in domain name system (DNS) defense, and a multi-mode matching function in a feature filtering function, cannot be implemented on the dedicated security chip. This reduces effectiveness and integrity of defense.

In other studies, an embedded hardware protection device, such as a firewall, performs fast traffic forwarding by using a dedicated security chip. Traffic is directly forwarded by using a dedicated security chip instead of being forwarded by using a CPU, so that an overall forwarding capability of the device is improved. However, in this manner, if the traffic is directly forwarded on the dedicated security chip, the dedicated security chip can only perform simple DDoS defense in case of occurrence of DDoS attacks, and cannot indicate the CPU to perform complete DDoS defense on attacked traffic. This also reduces effectiveness and integrity of defense.

In view of this, embodiments of this application provide a dedicated security chip-based method for dynamically defending against attacks. A dedicated security chip and a CPU are combined, to collaboratively defend against attacks. Specifically, the dedicated security chip is responsible for forwarding traffic related to an internet protocol (IP) address (or a relatively low-risk IP address) having no risk of being attacked. The CPU is responsible for forwarding traffic related to an IP address having a risk of being attacked (or an IP address with relatively high risks). In this way, comprehensive attack detection and defense can be implemented during forwarding processing. The dedicated security chip interacts with the CPU. The dedicated security chip sends, to the CPU, the traffic related to an IP address having a risk of being attacked; and directly forwards, without passing through the CPU, the traffic related to an IP address having no risk of being attacked. This reduces an amount of data that needs to be processed by the CPU. In this way, efficient and fast advantages of the dedicated security chip and comprehensive attack detection and defense capabilities of the CPU are used, to improve an overall attack detection and defense effect of the protection device.

In embodiments of this application, that traffic is related to an IP address having a risk of being attacked further includes a plurality of cases. For example, the traffic related to an IP address having a risk of being attacked means that a destination IP address of the traffic is an IP address having a risk of being attacked, and the traffic related to an IP address having no risk of being attacked means that a destination IP address of the traffic is an IP address having no risk of being attacked. For another example, the traffic related to an IP address having a risk of being attacked means that a source IP address of the traffic is an IP address having a risk of being attacked, and the traffic related to an IP address having no risk of being attacked means that a source IP address of the traffic is an IP address having no risk of being attacked.

In embodiments of this application, the IP address having a risk of being attacked includes but is not limited to an attacked IP address or a specially specified protected IP address. The IP address having no risk of being attacked includes but is not limited to an unattacked IP address or an IP address that is not specially specified to be protected.

The attacked IP address is an IP address that has been attacked by an attacker. The unattacked IP address is an IP address that has not been attacked by an attacker.

The specified protected IP address includes but is not limited to an IP address configured by a network administrator, for example, an IP address of a server in a local area network, a previously attacked IP address, a vulnerable IP address, and IP address on which a suspicious event (for example, a domain generation algorithm (DGA) event or an intranet brute force cracking event) previously occurred.

For example, when an IP address 1 has been attacked and an IP address 2 is not attacked, the dedicated security chip sends traffic related to the IP address 1 to the CPU, and the CPU further performs attack detection on the traffic related to the IP address 1. The dedicated security chip forwards traffic related to the IP address 2. In this manner, defense against network attacks can be implemented in the case of occurrence of the attacks.

For another example, when the IP address 1 is a specially specified protected IP address and the IP address 2 is not a specially specified protected IP address, the dedicated security chip sends the traffic related to the IP address 1 to the CPU, and the CPU further performs attack detection on the traffic related to the IP address 1. The dedicated security chip forwards the traffic related to the IP address 2. In this manner, a possible attack can be prevented, so that network security is improved.

Optionally, embodiments of this application are applied to defend against DDoS attacks. Optionally, embodiments of this application are specifically used to defend against a flood attack in the DDoS attacks. A type of the flood attack defended against in embodiments of this application includes but is not limited to a transmission control protocol (TCP) flood attack, a user datagram protocol (UDP) flood attack, a hypertext transfer protocol (HTTP) flood attack, a hypertext transfer protocol secure (HTTPS) flood attack, a DNS flood attack, an internet control message protocol (ICMP) flood attack, a session initiation protocol (SIP) flood attack, or the like. The defended TCP flood attack includes but is not limited to a synchronization (SYN) flood attack, an acknowledgement (ACK) flood attack, a synchronization sequence numbers acknowledgement (SYN ACK) flood attack, a reset the connection (RST) flood attack, or the like.

The following describes an example of an application scenario of an embodiment of this application.

FIG. 1 is a schematic diagram of an application scenario according to an embodiment of this application. The application scenario shown in FIG. 1 is a typical DDoS protection scenario. As shown in FIG. 1, network deployment in this protection scenario mainly relates to four components: a normal client, an attacker, a protection device, and a server respectively.

The following separately describes the four components by using examples.

(1) Normal Client

The normal client is an initiator of service traffic. The normal client generates service traffic and sends the service traffic to the server, to access a service provided by the server. The normal client is software such as browser software or service client software.

As shown in FIG. 1, a deployment position of the normal client in a network includes but is not limited to the following two cases.

In one possible case, the normal client is located in an internet. For example, in the scenario in FIG. 1, after the normal client in the internet initiates service traffic, the protection device intercepts the service traffic and performs security detection on the service traffic. When it is detected that there is no threat in the service traffic, the protection device forwards the service traffic to a protected server in a local area network.

In another possible case, the normal client is located in a local area network. For example, in the scenario in FIG. 1, after the normal client in the local area network initiates service traffic, the protection device intercepts the service traffic and performs security detection on the service traffic. When it is detected that there is no threat in the service traffic, the protection device forwards the service traffic to an external network server in an internet.

(2) Attacker

The attacker uses a tool, a zombie host, or a proxy to generate attack traffic, and sends the attack traffic to a protected server. Optionally, the attacker is located in the internet, that is, the attacker initiates an attack from the internet to the protected server or the normal client in the local area network. Alternatively, the attacker is located in the local area network, that is, the attacker initiates an attack from the local area network to the server in the internet.

(3) Protection Device

The protection device is configured to protect the local area network, for example, protect the protected server and the normal client in the local area network from being attacked, or protect a host in the local area network from being used by the attacker to spread a threat. The protection device is deployed between the local area network and the internet. In other words, the protection device is deployed at a border of the local area network. The protection device performs security detection on incoming and outgoing traffic of the local area network, to determine whether the traffic is service traffic or attack traffic. In addition, the protection device blocks attack traffic to ensure security of the protected server and forwards service traffic to ensure that the protected server can provide a service. The protection device includes but is not limited to integration of one or more of a firewall, a security gateway (such as a router or a switch), an intrusion detection system (IDS) device, an intrusion prevention system (IPS) device, a unified threat management (UTM) device, an anti-virus (AV) device, an anti-distributed denial-of-service (DDoS) (anti-DDoS) device, and a next generation firewall (NGFW).

(4) Server

As shown in FIG. 1, a deployment position of the server in a network includes but is not limited to the following two cases.

In a possible case, the server is deployed in the local area network. The server in the local area network is a protected server to be protected by the protection device.

In another possible case, the server is located in the internet. From a perspective of the normal client in the local area network, the server located in the internet is an external network server.

The server in the local area network or the internet is configured to respond to service traffic from the normal client, to provide a service for the normal client. The server includes but is not limited to an application server or a web server. The application server includes but is not limited to a game server, a video application server, a file server, a search engine server, an instant messaging server, or the like. The web server is alternatively referred to as a world wide web (web) server or a website server.

The following describes a basic hardware structure of the protection device by using an example.

Figure 2:
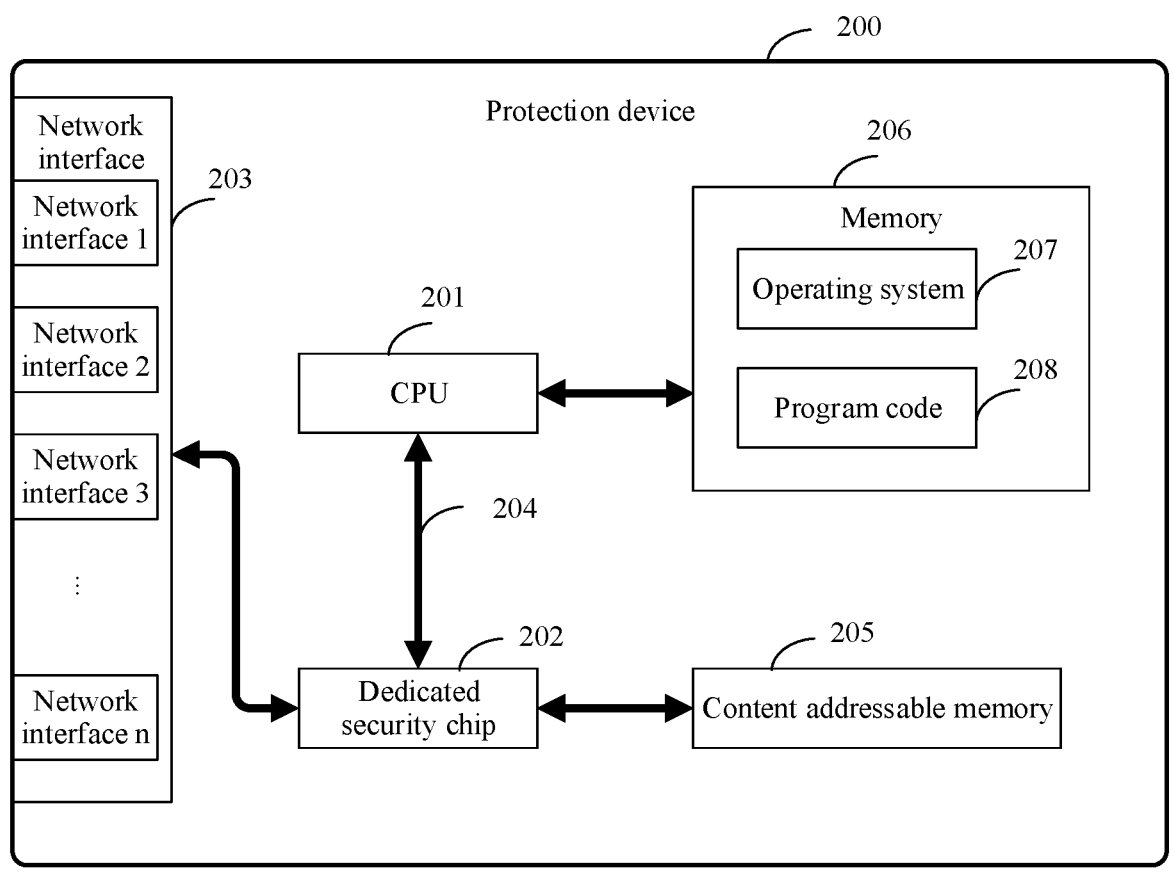
FIG. 2 is a schematic diagram of a structure of a protection device according to an embodiment of this application.

FIG. 2 is a schematic diagram of a structure of a protection device 200 according to an embodiment of this application. The protection device 200 includes a CPU 201, a dedicated security chip 202, and at least one network interface 203.

Optionally, with reference to FIG. 1, the protection device 200 in FIG. 2 is the protection device shown in FIG. 1.

Optionally, the CPU 201 in FIG. 2 is a CPU in the following method shown in FIG. 3, FIG. 4, FIG. 5, FIG. 6, FIG. 7, FIG. 8, FIG. 9, FIG. 10, FIG. 11, FIG. 12, FIG. 13, FIG. 14, or FIG. 15.

Optionally, the dedicated security chip 202 in FIG. 2 is a dedicated security chip in the following method shown in FIG. 3, FIG. 4, FIG. 5, FIG. 6, FIG. 7, FIG. 8, FIG. 9, FIG. 10, FIG. 11, FIG. 12, FIG. 13, FIG. 14, or FIG. 15.

Optionally, the network interface 203 in FIG. 2 is a network interface (for example, a first network interface or a second network interface) in FIG. 3, FIG. 4, FIG. 7, FIG. 8, FIG. 10, FIG. 11, FIG. 14, or FIG. 15.

The CPU 201 is a general-purpose central processing unit, and has high scalability and flexibility. For example, the CPU 201 is a single-core processor (single-CPU), or is a multi-core processor (multi-CPU).

The dedicated security chip 202 is a high-performance processing hardware module. The dedicated security chip 202 includes at least one of an application-specific integrated circuit (ASIC), a field-programmable gate array (FPGA), or a network processor (NP).

The at least one network interface 203 includes, for example, a network interface 1, a network interface 2, a network interface 3, . . . , and a network interface n in FIG. 2. The network interface 203 is configured to communicate with another device or a communication network by using any apparatus such as a transceiver. For example, the network interface 1 in FIG. 2 communicates with a first network device, and the network interface 2 in FIG. 2 communicates with a second network device. Optionally, the network interface 203 includes at least one of a wired network interface or a wireless network interface. The wired network interface is, for example, an Ethernet interface. The Ethernet interface is, for example, an optical interface, an electrical interface, or a combination thereof. The wireless network interface is, for example, a wireless local area network (WLAN) interface, a cellular network interface, or a combination thereof.

An internal connection 204 is used to connect the at least one network interface 203 to the dedicated security chip 202, and connect the dedicated security chip 202 to the CPU 201. The internal connection 204 includes a path for transmitting data between the network interface 203, the dedicated security chip 202, and the CPU 201. Optionally, the internal connection 204 is a board or a bus. For example, the internal connection 204 is Ethernet, a fibre channel, PCI-E (peripheral component interconnect express, PCI Express, a high-speed serial computer bus), RapidIO (a data packet switching-based interconnection architecture with high performance and a low quantity of pins), InfiniBand, or an XAUI bus (an interface extender, characterized by connecting an Ethernet media access control (MAC) layer to a physical layer).

Optionally, the protection device further includes a content addressable memory (CAM) 205. The CAM 205 is, for example, a ternary content addressable memory (TCAM). The CAM 205 is configured to store an IP address table. The IP address table can be accessed by the dedicated security chip 202. The IP address table stored on the CAM 205 includes but is not limited to at least one of a destination IP table or a source IP table. Content of the IP address table stored on the CAM 205 is, for example, an IP address having a risk of being attacked, or an IP address having no risk of being attacked. In some embodiments, the dedicated security chip 202 stores the IP address table by using the CAM 205. Optionally, the CAM 205 exists independently, and is connected to the dedicated security chip 202 through the internal connection 204. Alternatively, optionally, the CAM 205 is integrated with the dedicated security chip 202, that is, the CAM 205 is used as a memory inside the dedicated security chip 202.

Optionally, the protection device further includes a memory 206. For example, the memory 206 is a read-only memory (ROM) or another type of static storage device capable of storing static information and instructions, or a random access memory (RAM) or another type of dynamic storage device capable of storing information and instructions, or an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium capable of carrying or storing expected program code 208 in an instruction form or a data structure form and capable of being accessed by a computer. However, the memory is not limited thereto. For example, the memory 206 exists independently, and is connected to the CPU 201 through the internal connection 204. Alternatively, optionally, the memory 206 and the CPU 201 are integrated together.

The memory 206 stores an operating system 207 and the program code 208. Optionally, the at least one processor reads the operating system 207 from the memory 206 and runs the operating system 207. The dedicated security chip 202 reads the program code 208 from the memory 206, and implements the method provided in embodiments of this application by running the program code 208 in the operating system 207. For example, in a process of running the program code 208, the dedicated security chip 202 performs the following process: After the dedicated security chip 202 receives traffic from one network interface of the at least one network interface 203, the dedicated security chip 202 matches a destination IP address of the traffic or a source IP address of the traffic with the IP address table, and forwards the traffic through another network interface of the at least one network interface 203 based on a matching result, or sends the traffic to the CPU 201, so that the CPU 201 performs further detection. Alternatively, the dedicated security chip 202 implements the method provided in embodiments of this application by running the internally stored program code 208. For example, a computer instruction for matching the destination IP address or the source IP address of the traffic with the IP address table and forwarding the traffic based on the matching result is burnt into the dedicated security chip 202 in advance.

The following describes a method process in embodiments of this application by using an example.

Figure 3:
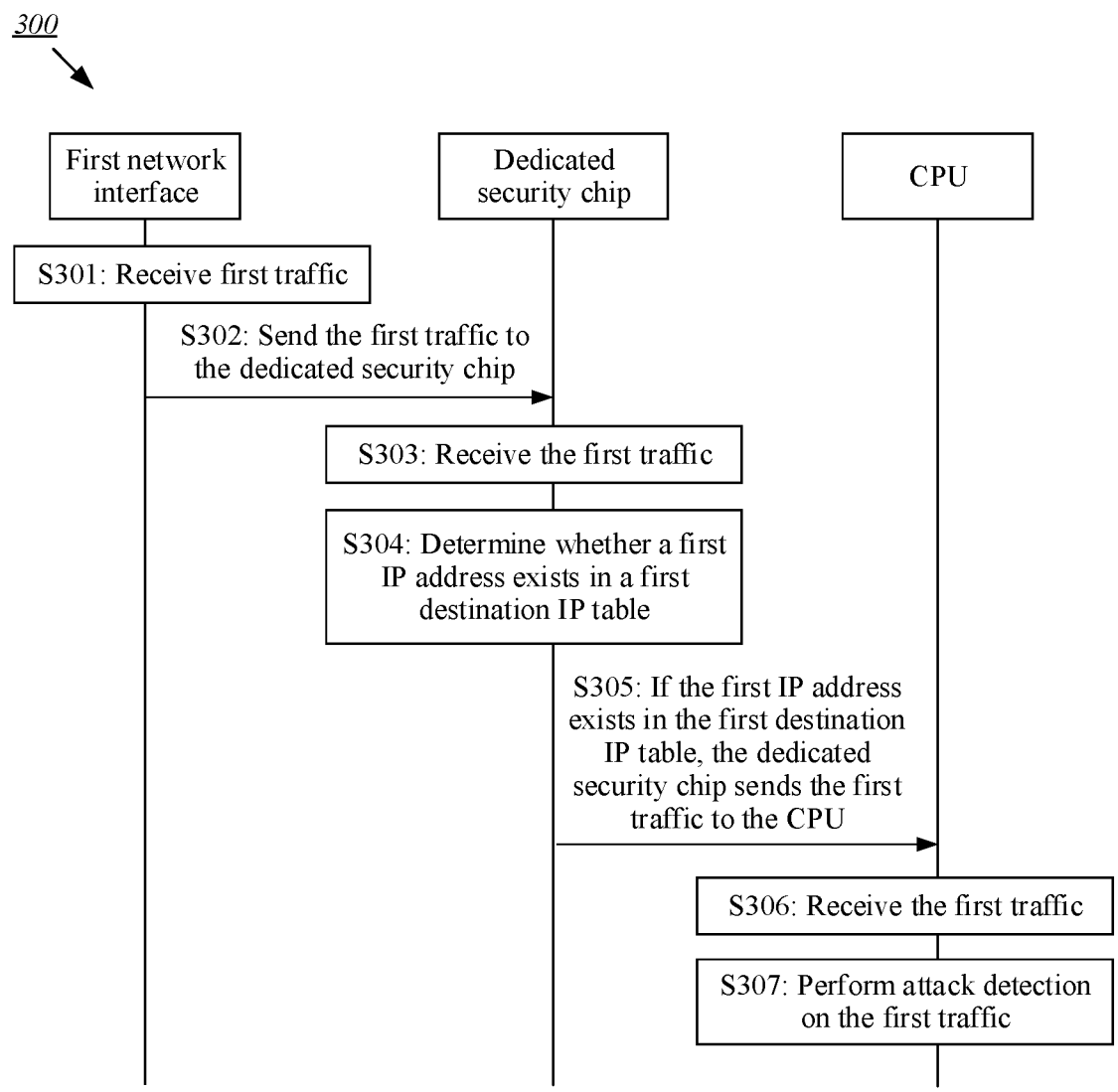
FIG. 3 is a flowchart of a traffic processing method according to an embodiment of this application.

FIG. 3 is a flowchart of a traffic processing method 300 according to an embodiment of this application. The method 300 includes the following step S301 to step S307.

Optionally, a network deployment scenario on which the method 300 is based is shown in FIG. 1. For example, with reference to FIG. 1, a protection device in the method 300 is the protection device in FIG. 1, traffic received by the protection device in the method 300 comes from the normal client or the attacker in FIG. 1, a destination of the traffic in the method 300 is the protected server in FIG. 1, and a first destination IP table in the method 300 includes an IP address of the protected server.

A protection device to which the method 300 is applicable includes but is not limited to one physical device, or a distributed system (sometimes referred to as a protection system) including a plurality of physical devices. When the protection device in the method 300 is implemented by using one physical device, the following step S305 is performed through interaction between a dedicated security chip and a CPU in a same physical device, and traffic of the interaction between the dedicated security chip and the CPU is optionally transmitted through a bus inside the physical device. When the protection device in the method 300 is implemented by using a plurality of physical devices (for example, a cluster computer), the following step S305 is performed through interaction between a dedicated security chip in one physical device and a CPU in another physical device.

Optionally, the protection device in the method 300 has the hardware structure shown in FIG. 2. For example, with reference to FIG. 2, a CPU in the method 300 is the CPU 201 in FIG. 2, a dedicated security chip in the method 300 is the dedicated security chip 202 in FIG. 2, and a first network interface in the method 300 is one network interface of the at least one network interface 203 in FIG. 2.

The method 300 relates to interaction between the dedicated security chip and at least one network interface in the protection device. To distinguish different network interfaces, a "first network interface" and a "second network interface" are used to distinguish and describe different network interfaces.

Step S301: A first network interface of a protection device receives first traffic from a first network device.

The first network interface is configured to receive traffic sent by the first network device.

A destination IP address of the first traffic includes a first IP address. For example, a packet header (for example, an IP header) of a packet in the first traffic includes a destination address field, and content of the destination address field includes the first IP address.

Step S302: The first network interface sends the first traffic to a dedicated security chip.

Step S303: The dedicated security chip receives the first traffic from the first network interface of the protection device.

Step S304: The dedicated security chip determines whether the first IP address exists in a first destination IP table stored on the dedicated security chip.

Sometimes, the first destination IP table is alternatively referred to as a destination IP table having a risk of being attacked. The first destination IP table includes at least one IP address having a risk of being attacked. Specifically, the first destination IP table includes at least one entry, and each entry includes one IP address having a risk of being attacked. The first destination IP table includes a plurality of types of data structures. For example, the first destination IP table is a one-dimensional array or a hash conflict linked list. Optionally, the IP address in the first destination IP table is delivered by the CPU to the dedicated security chip.

A determining action of the dedicated security chip is implemented, for example, by searching a table. For example, the dedicated security chip obtains the first IP address from a destination IP address field of a packet in the first traffic. The dedicated security chip searches the first destination IP table by using the first IP address as an index. A search process is a process of determining whether an entry that is the same as the first IP address exists in the first destination IP table. In a case in which the entry that is the same as the first IP address is found in the first destination IP table, the first IP address exists in the first destination IP table. In a case in which no entry that is the same as the first IP address is found in the first destination IP table, the first IP address does not exist in the first destination IP table. Optionally, a specific table search process includes: The dedicated security chip compares the first IP address with an IP address in an entry in the first destination IP table, and if the first IP address is the same as the IP address in the entry, the dedicated security chip determines that the first IP address is found, or if the first IP address is different from the IP address in the entry, the dedicated security chip continues to search for a next entry.

Step S305: If the first IP address exists in the first destination IP table, the dedicated security chip sends the first traffic to the CPU.

Step S306: The CPU receives the first traffic from the dedicated security chip.

Step S307: The CPU performs attack detection on the first traffic.

A manner in which the CPU performs attack detection includes but is not limited to manners such as source authentication, feature filtering, rate limiting, and content-based detection. The source authentication includes but is not limited to transport protocol layer source authentication, application layer source authentication, verification code authentication, or the like. The feature filtering includes but is not limited to matching by using a pre-stored feature database. The content-based detection means that after session reassembly is performed on the first traffic, content (for example, various files) carried in a session is obtained, and then application-layer detection or identification is performed on the content carried in the session.

In some embodiments, the CPU performs cleaning processing on the first traffic based on a result of attack detection. The cleaning processing means removing an abnormal and threatening packet from the first traffic, and leaving a normal service packet in the first traffic. After cleaning is completed, the normal service packet in the first traffic is sent to a destination.

A specific implementation in which the CPU sends the normal service packet in the first traffic to the destination is as follows: The CPU sends the normal service packet to the second network interface, the second network interface sends the normal service packet to the second network device, and then the second network device forwards the normal service packet to the destination. For example, the first traffic includes a packet A and a packet B. The CPU performs attack detection on the packet A and the packet B, and finds that the packet A is an attack packet and the packet B is a normal service packet. The CPU discards the packet A, and the CPU sends the packet B to the second network interface of the protection device, so that the second network interface forwards the packet B.

In the method provided in embodiments, the dedicated security chip is combined with the CPU, and the dedicated security chip sends, to the CPU, traffic whose destination IP address is in a table (the first destination IP address table) of IP addresses having a risk of being attacked, so that the CPU further defends against traffic having an attack risk. This helps resolve a problem that exists when only a dedicated security chip or only a CPU is used for attack defense. Therefore, effectiveness and integrity of defense are improved.

In conclusion, the method 400 provides a manner of performing traffic distribution control based on a destination IP address. After receiving traffic from the first network interface, the dedicated security chip matches a destination IP address of the traffic with the IP address table, and determines, based on a matching result, to forward the traffic through the second network interface, or to send the traffic to the CPU, so that the CPU performs further detection. In some other embodiments of this application, traffic distribution control is performed based on a source IP address. The dedicated security chip matches a source IP address of the traffic with the IP address table, and determines, based on a matching result, to forward the traffic through the second network interface, or to send the traffic to the CPU, so that the CPU performs further detection. Specifically, the first IP address in the foregoing method 400 is replaced with a source IP address of the first traffic, and the first destination IP table is replaced with a first source IP table. In other words, the source IP address of the first traffic received by the dedicated security chip from the first network interface includes the first IP address. The dedicated security chip determines whether the first IP address exists in the first source IP table stored on the dedicated security chip, where the first source IP table includes at least one IP address having a risk of being attacked. If the first IP address exists in the first source IP table, the dedicated security chip sends the first traffic to the CPU; or if the first IP address does not exist in the first source IP table, the dedicated security chip sends the first traffic to the second network interface.

The foregoing describes actions performed by the dedicated security chip when the first IP address exists in the first destination IP table. Actions performed by the dedicated security chip when the first IP address does not exist in the first destination IP table are optionally shown in FIG. 4.

Figure 4:
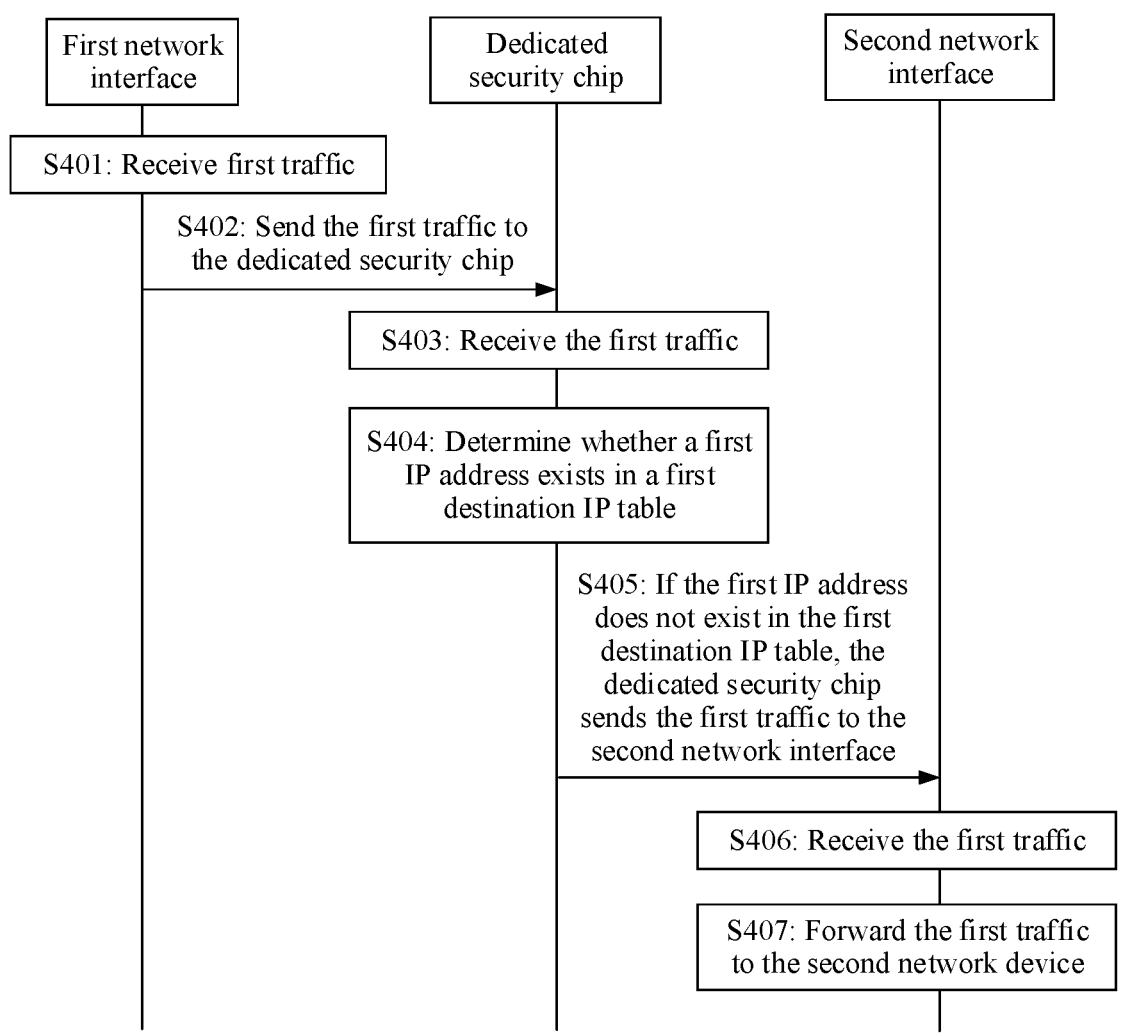
FIG. 4 is a flowchart of a traffic processing method according to an embodiment of this application.

A method 400 shown in FIG. 4 includes step S401 to step S407. A main difference between FIG. 4 and FIG. 3 lies in step S405 to step S407. Step S401 to step S404 in FIG. 4 are similar to step S301 to step S304 in FIG. 3. For details, refer to related descriptions in FIG. 3.

Step S401: A first network interface of a protection device receives first traffic from a first network device.

Step S402: The first network interface sends the first traffic to a dedicated security chip.

Step S403: The dedicated security chip receives the first traffic from the first network interface.

Step S404: The dedicated security chip determines whether the first IP address exists in a first destination IP table stored on the dedicated security chip.

Step S405: If the first IP address does not exist in the first destination IP table, the dedicated security chip sends the first traffic to a second network interface of the protection device.

Specifically, the dedicated security chip searches a routing table or a session table based on the first IP address. If the dedicated security chip finds that an outbound interface corresponding to the first IP address is the second network interface, the dedicated security chip sends the first traffic to the second network interface.

Step S406: The second network interface receives the first traffic sent by the dedicated security chip.

Step S407: The second network interface forwards the first traffic to the second network device.

In the foregoing method 400, normal traffic (that is, traffic whose destination IP address is an IP address having no risk of being attacked) is directly forwarded by the dedicated security chip instead of being sent to the CPU. Therefore, forwarding burden of the CPU on normal traffic is reduced, and traffic destined for an IP address having no risk of being attacked is not affected when the CPU rushes high. In addition, high-performance hardware of the dedicated security chip can be used to implement fast traffic forwarding, so that overall forwarding performance of the protection device is improved.

In addition, for the embodiment in which traffic distribution control is performed based on the source IP address, the foregoing step S405 may be replaced with: If the first IP address does not exist in the first source IP table, the dedicated security chip sends the first traffic to the second network interface of the protection device.

The following describes the processing logic described above by using an example with reference to the scenario shown in FIG. 1.

Refer to FIG. 1. In an example scenario, the attacker uses a protected server A as an attack target, and the attacker sends attack traffic to the protected server A by using a tool, a zombie host, or a proxy. A destination IP address of the attack traffic is an IP address of the server A. A server B and a server C provide services normally, and the server B and the server C are not attacked.

With reference to this scenario, an IP address of the server A exists in the first destination IP table, but an IP address of the server B and an IP address of the server C do not exist in the first destination IP table. When the protection device receives a packet whose destination is the server A, if the dedicated security chip finds that a destination IP address of the packet is in the first destination IP table, the dedicated security chip sends the packet to the CPU. When the protection device receives a packet whose destination is the server B, if the dedicated security chip finds that a destination IP address of the packet is not in the first destination IP table, the dedicated security chip directly forwards the packet.

Optionally, the embodiments further support a self-update mechanism for the destination IP table. Specifically, the CPU collects statistics on a rate of data destined for a destination IP address based on traffic sent by the dedicated security chip. If the CPU finds, through statistics collection, that a destination IP address is attacked, the CPU delivers a message, to indicate the dedicated security chip to add an entry corresponding to the destination IP address to the destination IP table, so as to trigger the destination IP address having a risk of being attacked to be stored in the destination IP table on the dedicated security chip. Similarly, if the CPU finds, through statistics collection, that a destination IP address has no risk of being attacked (for example, an attack has ended), the CPU delivers a message, to indicate the dedicated security chip to delete an entry corresponding to the destination IP address from the destination IP table, so as to trigger the destination IP address to be deleted from the destination IP table on the dedicated security chip. In this way, the destination IP table on the dedicated security chip can be self-updated.

A basic principle for the CPU to find the attack by collecting statistics on the rate is as follows: The CPU determines whether a rate of data destined for a destination IP address exceeds or is lower than a specified threshold within a continuous time period. If the rate of data destined for a destination IP address exceeds the threshold within the continuous time period, it is detected that the destination IP address is attacked. Alternatively, if the rate of data destined for a destination IP address is lower than the threshold within the continuous time period, it is detected that the destination IP address is not attacked. The rate threshold used when the CPU performs detection includes a plurality of cases. Optionally, the rate threshold is a value preconfigured by a network administrator. Alternatively, the rate threshold is a value obtained by the protection device by periodically collecting statistics on and learning user network traffic by using a dynamic traffic baseline technology.

The rate of the data destined for the destination IP address includes but is not limited to a packet rate or a bandwidth rate.

The packet rate is used to describe a quantity of data packets transmitted per unit of time. For example, a unit of the packet rate is packets per second (PPS). PPS refers to a quantity of data packets transmitted per second.

The bandwidth rate is used to describe a quantity of bits transmitted per unit of time. For example, a unit of the bandwidth rate is bits per second (bps), kilobits per second (Kbps), million bits per second (Mbps), or the like.

For ease of understanding by a reader, in this embodiment, an example in which the CPU collects statistics on the first IP address and delivers a message, and the dedicated security chip updates the destination IP table for the first IP address is used to describe a series of processing processes for one destination IP address. Optionally, this embodiment is applied to a case in which a plurality of destination IP addresses are separately processed. For a processing process for another destination IP address, refer to the processing process for the first IP address.

In addition, to distinguish messages delivered in different scenarios, an "addition message" is used to describe a message sent by the CPU in a scenario in which an IP address is added to the destination IP address table, and a "delete message" is used to describe a message delivered in a scenario in which an IP address is added to the destination IP address table.

Figure 5:
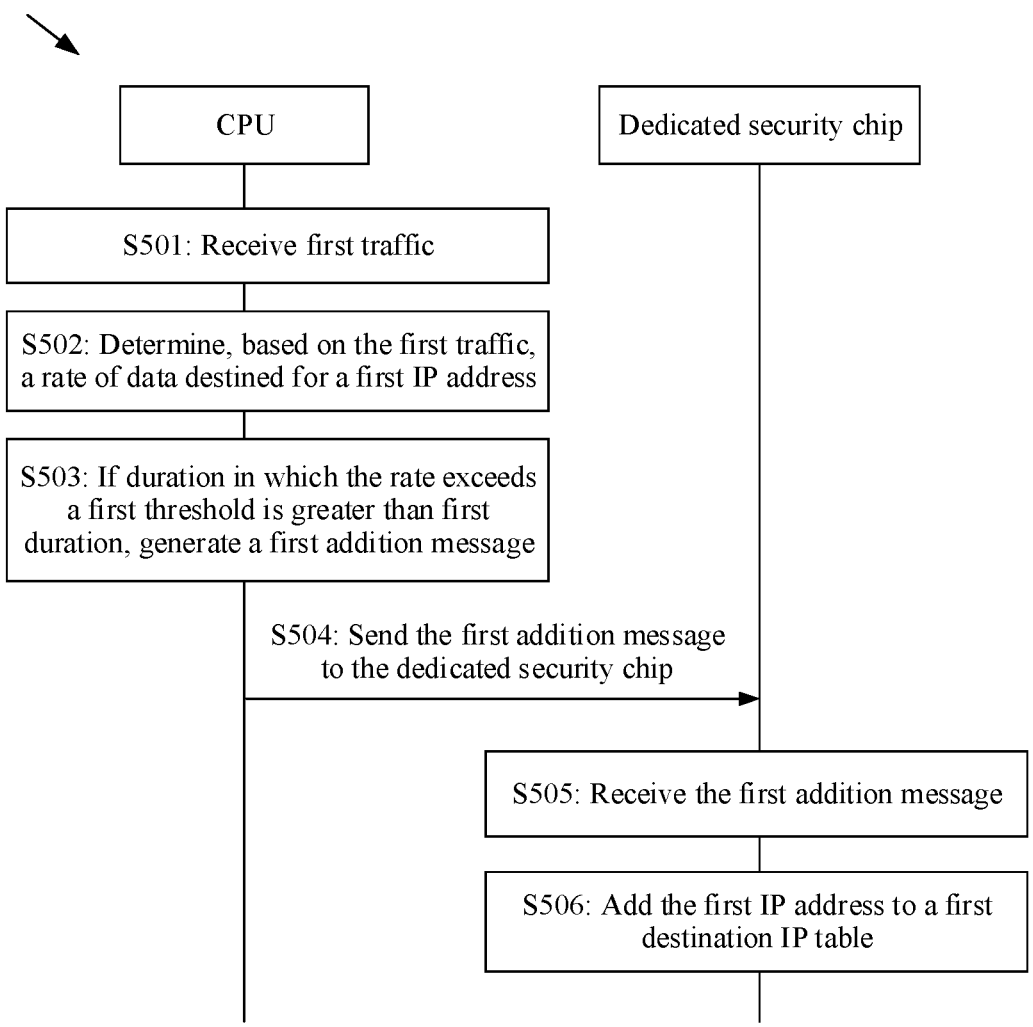
FIG. 5 is a flowchart of a traffic processing method according to an embodiment of this application.

A process of adding the first IP address to the first destination IP table is optionally shown in FIG. 5. A method 500 shown in FIG. 5 includes step S501 to step S506.

Step S501: A CPU receives first traffic from a dedicated security chip.

Step S502: The CPU determines, based on the first traffic, a rate of data destined for a first IP address.

The first IP address is a destination IP address. In some embodiments, the first IP address is a destination IP address of a packet in the first traffic; or the first IP address is an IP address in an entry in a destination IP table.

The rate of the data destined for the first IP address is, for example, a transmission rate of data whose destination IP address is the first IP address.

Step S503: If duration in which the rate exceeds a first threshold is greater than first duration, the CPU generates a first addition message.

The first threshold is a rate threshold. The first duration is a duration threshold. The first addition message indicates to add the first IP address to a first destination IP table. The first addition message includes the first IP address.

Specifically, when collecting statistics on the first IP address, the CPU determines whether the duration in which the rate of the data destined for the first IP address exceeds the first threshold is greater than the first duration. If the duration in which the rate of the data destined for the first IP address exceeds the first threshold is greater than the first duration, it indicates that the first IP address is attacked. In this case, the CPU generates and delivers the first addition message.

For example, a rate threshold for a SYN flood attack is set to 1000 pps and an attack detection time period is set to 3 seconds. If traffic of SYN packets reaching 128.1.1.2 exceeds 1000 pps within consecutive 3 seconds, it indicates that the SYN flood attack starts to occur. The SYN flood attack is an example of an attack; 1000 pps is an example of the first threshold; 3 seconds is an example of the first duration; 128.1.1.2 is an example of the first IP address, where 128.1.1.2 is specifically an IPv4 address expressed in dotted decimal notation; and a message including 128.1.1.2 is an example of the first addition message. A unit pps indicates a packet forwarding rate, and is also referred to as packet per second.

Step S504: The CPU sends the first addition message to the dedicated security chip.
Step S505: The dedicated security chip receives the first addition message from the CPU.
Step S506: The dedicated security chip adds the first IP address to the first destination IP table in response to the first addition message.

The dedicated security chip obtains the first IP address from the first addition message. The dedicated security chip adds a corresponding entry to the first destination IP table based on the obtained first IP address. The added entry includes the first IP address, so that the first IP address is stored in the first destination IP table. For example, the first IP address included in the first addition message is 128.1.1.2. The dedicated security chip adds an entry including 128.1.1.2 to the first destination IP table, so that 128.1.1.2 is stored in the first destination IP table.

The dedicated security chip can dynamically adjust, by adding the first IP address to the first destination IP table, traffic whose destination IP address is the first IP address to be processed between the dedicated security chip and the CPU. Specifically, when the first destination IP table originally does not include the first IP address, traffic whose destination IP address is the first IP address is directly forwarded by using the dedicated security chip. After the dedicated security chip adds the first IP address to the first destination IP table, the traffic whose destination IP address is the first IP address is sent to the CPU by using the dedicated security chip for further security detection.

In the foregoing method 500, when finding that a destination IP address is attacked, the CPU delivers a message to the dedicated security chip, to indicate the dedicated security chip to add an entry including the IP address to the destination IP table, so that a new IP address having a risk of being attacked can be automatically added to the destination IP table. In this way, the destination IP table on the dedicated security chip can be self-updated, and is dynamically updated based on new malicious traffic in an actual network environment in which the protection device is located, so that network adaptability and an update effect are improved.

Further, newly emerging attacked IP addresses are added to the destination IP address table in a timely manner. Therefore, processing logic of the dedicated security chip for traffic destined for the newly emerging attacked IP addresses is quickly switched, and the dedicated security chip sends, to the CPU for defense, the traffic destined for the newly emerging attacked IP addresses. This helps perform effective and complete defense for these newly emerging attacked IP addresses in a more timely manner.

In addition, for the embodiment in which traffic distribution control is performed based on the source IP address, "the rate of the data destined for the first IP address" in step S502 may be replaced with "a rate of data coming from the first IP address". The rate of the data coming from the first IP address is, for example, a transmission rate of data whose source IP address is the first IP address. The first addition message indicates to add the first IP address to a first source IP table. Content of "adds the first IP address to the first destination IP table" in step S506 may be replaced with "adds the first IP address to the first source IP table".

Figure 6:
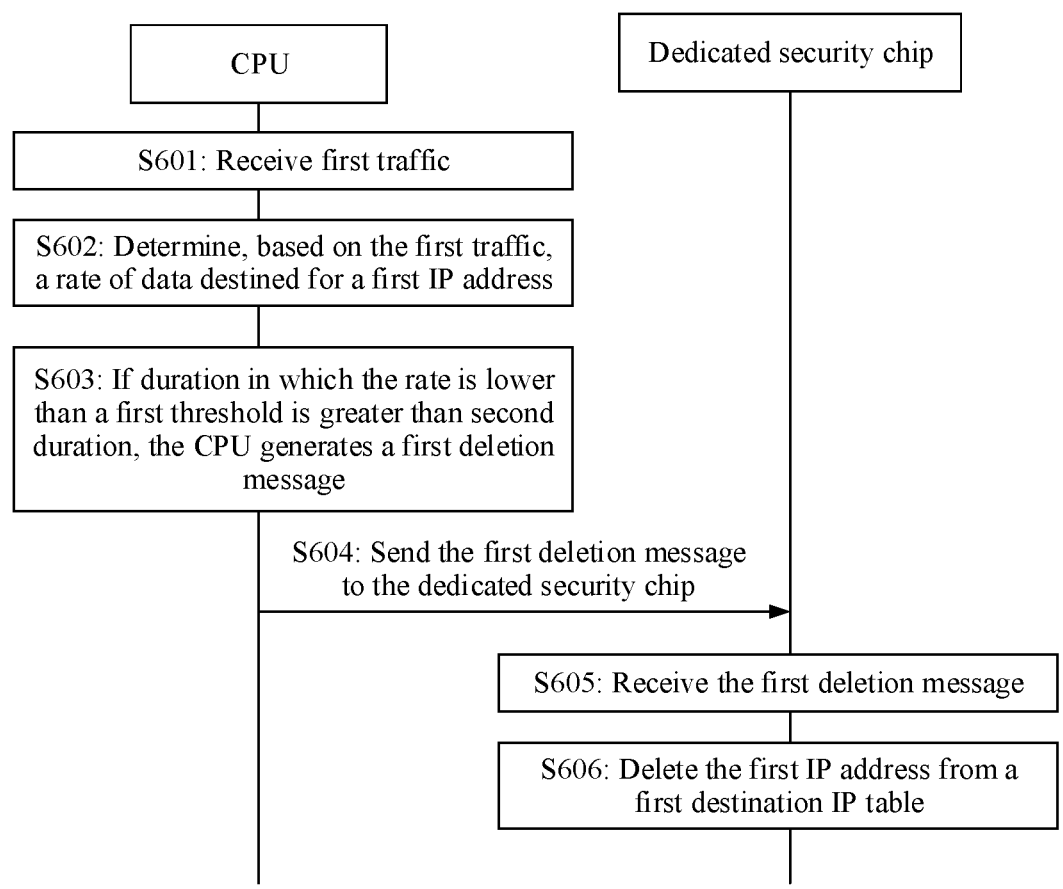
FIG. 6 is a flowchart of a traffic processing method according to an embodiment of this application.

A process of deleting the first IP address from the first destination IP table is optionally shown in FIG. 6. A method 600 shown in FIG. 6 includes step S601 to step S606.

Step S601: A CPU receives first traffic from a dedicated security chip.
Step S602: The CPU determines, based on the first traffic, a rate of data destined for a first IP address.
Step S603: If duration in which the rate is lower than a first threshold is greater than second duration, the CPU generates a first deletion message.

The second duration is a duration threshold. Optionally, the second duration is equal to the first duration. Alternatively, the second duration is unequal to the first duration.

The first deletion message indicates to delete the first IP address from a first destination IP table. Optionally, the first deletion message includes the first IP address, or the first deletion message does not include the first IP address but includes data (for example, a query index corresponding to the first IP address in the first destination IP table) associated with the first IP address.

For example, a detection time period of a SYN flood attack is set to 3 seconds. If traffic of SYN packets reaching 128.1.1.2 (the first IP address) is lower than a threshold within consecutive 3 seconds, the CPU determines that the SYN flood attack ends. In this case, the CPU delivers a message (the first deletion message) to indicate the dedicated security chip to delete an entry including 128.1.1.2 from the destination IP table.

Step S604: The CPU sends the first deletion message to the dedicated security chip.
Step S605: The dedicated security chip receives the first deletion message from the CPU.
Step S606: The dedicated security chip deletes the first IP address from the first destination IP table in response to the first deletion message.

The dedicated security chip can dynamically adjust, by deleting the first IP address from the first destination IP table, traffic whose destination IP address is the first IP address to be processed between the dedicated security chip and the CPU. Specifically, when the first destination IP table originally includes the first IP address, the first traffic whose destination IP address is the first IP address is sent to the CPU by using the dedicated security chip for further security detection. After the dedicated security chip deletes the first IP address from the first destination IP table, the first traffic whose destination IP address is the first IP address is directly forwarded by using the dedicated security chip.

In the foregoing method 600, when continuously finding no attacked destination IP address, the CPU delivers a message to the dedicated security chip, to indicate the dedicated security chip to delete the IP address to the destination IP table, so that an IP address on which the attack ends can be automatically deleted from the destination IP table. In this way, the destination IP table on the dedicated security chip can be self-updated, and is dynamically updated based on new malicious traffic in an actual network environment in which the protection device is located, so that network adaptability and an update effect are improved.

Further, the IP address on which the attack ends is deleted from the destination IP address table in a timely manner. Therefore, processing logic of the dedicated security chip for traffic destined for the IP address on which the attack ends is quickly switched, and the traffic destined for the IP address on which the attack ends is triggered to continue to be directly forwarded by the dedicated security chip. This helps reduce a load of the CPU and improve overall forwarding performance of a device.

In addition, for the embodiment in which traffic distribution control is performed based on the source IP address, "the rate of the data destined for the first IP address" in step S602 may be replaced with "a rate of data coming from the first IP address". The first deletion message indicates to delete the first IP address from a first source IP table. Content of "deletes the first IP address from the first destination IP table" in step S506 may be replaced with "deletes the first IP address from the first source IP table".

Optionally, the statistical rate mentioned above is implemented based on a sampling and restoration mechanism. Sampling means that the dedicated security chip copies or extracts a packet from traffic based on a sampling ratio and sends the packet to the CPU for processing. Restoration means that the CPU converts a quantity of sampled packets into a quantity of packets in the traffic based on the sampling ratio. For example, if the sampling ratio is 128:1, when the dedicated security chip sends 128 packets, the dedicated security chip selects one packet as sampled packets and sends the sampled packets to the CPU for processing. When the CPU receives sampled packets, the CPU considers, based on the sampling ratio, that 128 packets are received.

A sampled packet is also referred to as a sampling packet. The sampled packet is a packet obtained through sampling the first traffic. In some embodiments, the sampled packet is a packet included in the first traffic. In some other embodiments, the sampled packet is a packet obtained through copying a packet included in the first traffic.

The sampling ratio indicates a ratio of a quantity of packets included in the first traffic to a quantity of the sampled packets. For example, the sampling ratio is greater than 1. The sampling ratio used when the CPU determines the rate and the sampling ratio used when the dedicated security chip performs sampling are the same. Optionally, the sampling ratio is preconfigured by a network administrator. Alternatively, the sampling ratio is determined by the CPU and the dedicated security chip in advance through negotiation.

With reference to the sampling and restoration mechanism, for example, a process of collecting statistics on the rate includes: The dedicated security chip samples the first traffic to obtain sampled packets, and the dedicated security chip sends the sampled packets to the CPU. For example, the dedicated security chip selects sampled packets from the first traffic based on the sampling ratio. The CPU receives the sampled packets from the dedicated security chip; the CPU determines a rate at which the sampled packets are received; and the CPU determines, based on the rate at which the sampled packets are received and the sampling ratio, a rate corresponding to the first IP address. The rate determined by the CPU is a product of the rate at which the sampled packets are received and the sampling ratio. For example, the dedicated security chip sends the sampled packets based on the sampling ratio of 128:1. If the CPU finds that the rate at which the sampled packets are received is n, the CPU determines that the rate is 128×n.

The rate corresponding to the first IP address includes but is not limited to the rate of the data destined for the first IP address and the rate of the data coming from the first IP address. For example, for the embodiment in which traffic distribution control is performed based on the destination IP address, the dedicated security chip samples the first traffic whose destination address is the first IP address, and sends sampled packets to the CPU. The CPU determines, based on the sampling ratio and a rate at which sampled packets whose destination IP addresses are the first IP address are received, the rate of the data destined for the first IP address. For the embodiment in which traffic distribution control is performed based on the source IP address, the dedicated security chip samples the first traffic whose source address is the first IP address, and sends sampled packets to the CPU. The CPU determines, based on the sampling ratio and a rate at which sampled packets whose source IP addresses are the first IP address are received, the rate of the data coming from the first IP address.

According to the sampling and restoration mechanism, the dedicated security chip samples traffic and sends the sampled traffic to the CPU, to help the CPU monitor traffic in real time by using sampled packets. This helps detect, in a more timely manner, whether the traffic is in an attack state. In addition, normal forwarding of the traffic is not affected.

The following uses an example to describe the method processes shown in FIG. 3, FIG. 4, FIG. 5, and FIG. 6 as a whole.

Example 1

Figure 7:
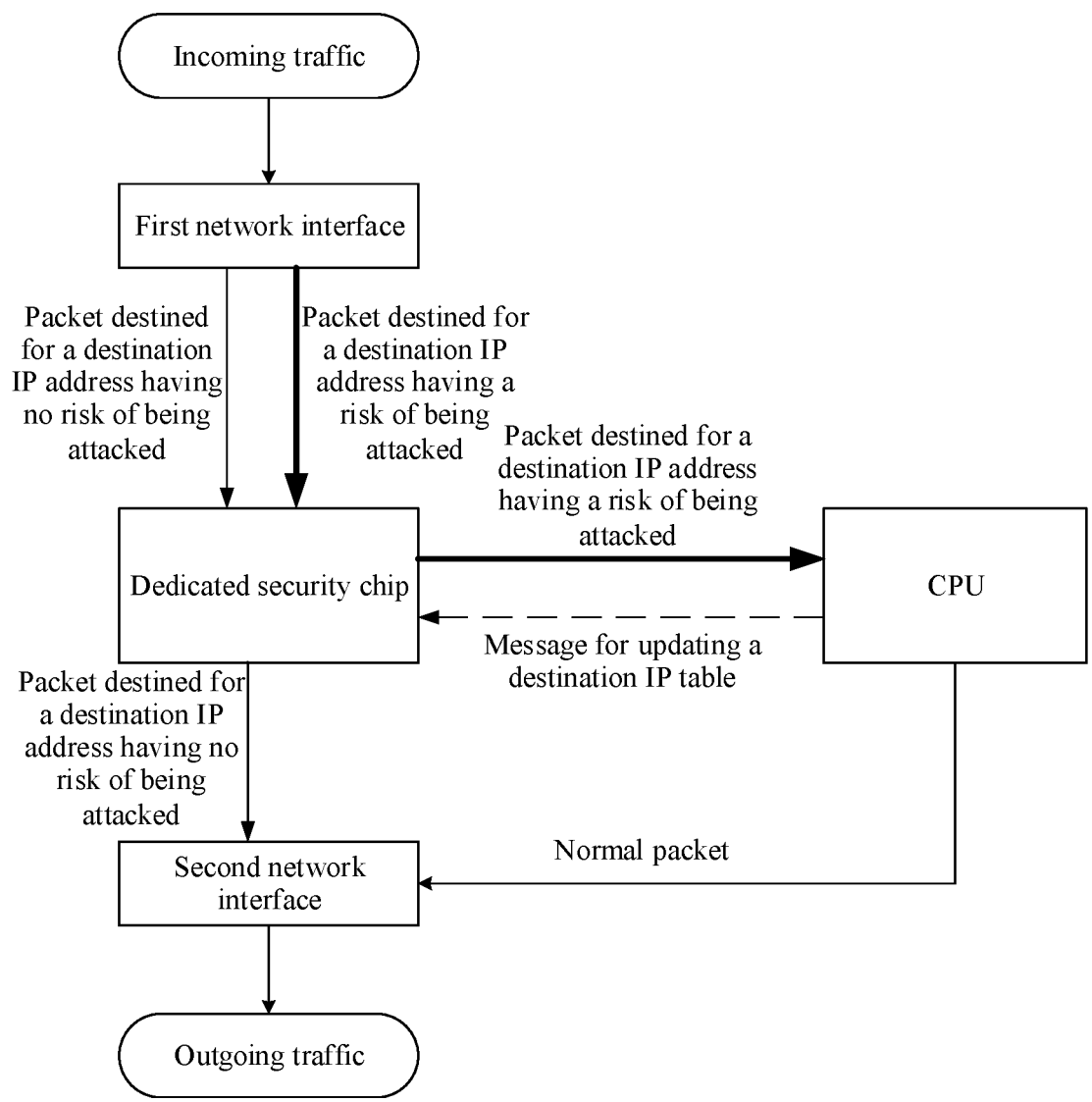
FIG. 7 is a flowchart of a traffic processing method according to an embodiment of this application.

An overall solution of Example 1 is shown in FIG. 7. Traffic destined for a destination IP address having no risk of being attacked is directly forwarded by using the dedicated security chip. Traffic destined for an attacked destination IP address is sent to the CPU by using the dedicated security chip for defense. Then, the CPU forwards normal traffic in the traffic destined for the attacked destination IP address.

Refer to FIG. 7. The following briefly describes a main process of processing traffic by a protection device with reference to FIG. 7.

First, from a perspective of a first network interface, after incoming traffic from an external device enters the first network interface, the first network interface sends the traffic to a dedicated security chip. The traffic sent by the first network interface includes traffic destined for a destination IP address having no risk of being attacked, and also includes traffic destined for an attacked destination IP address.

Then, from a perspective of the dedicated security chip, after the dedicated security chip receives the traffic from the first network interface, if a destination IP address of the traffic is in a first destination IP table, the dedicated security chip sends the traffic to the CPU. Alternatively, if a destination IP address of the traffic is not in a first destination IP table, the dedicated security chip sends the traffic to a second network interface. The dedicated security chip performs such an action, so that the traffic of the attacked destination IP address is sent to the CPU, and the traffic of the attacked destination IP address is transmitted to the second network interface.

From a perspective of the CPU, after receiving the traffic sent by the dedicated security chip, the CPU performs defense processing on the traffic. Specifically, the CPU detects the traffic sent by the dedicated security chip, to determine specific packets that are attack packets and specific packets that are normal packets in the traffic sent by the dedicated security chip. The CPU discards the attack packets, and sends the normal packets to the second network interface.

Finally, from a perspective of the second network interface, the traffic received by the second network interface includes two parts: the traffic that is sent by the dedicated security chip and that is sent to the destination IP address having no risk of being attacked, and the normal packets sent by a CPU. The second network interface forwards the received traffic.

The foregoing describes the main process of processing traffic by the protection device. In addition, as shown in FIG. 7, in a process of detecting the traffic, the CPU delivers a message (for example, the first addition message or the first deletion message described above) including a destination IP to the dedicated security chip based on a detection result, to update content of the first destination IP table on the dedicated security chip.

Figure 8:
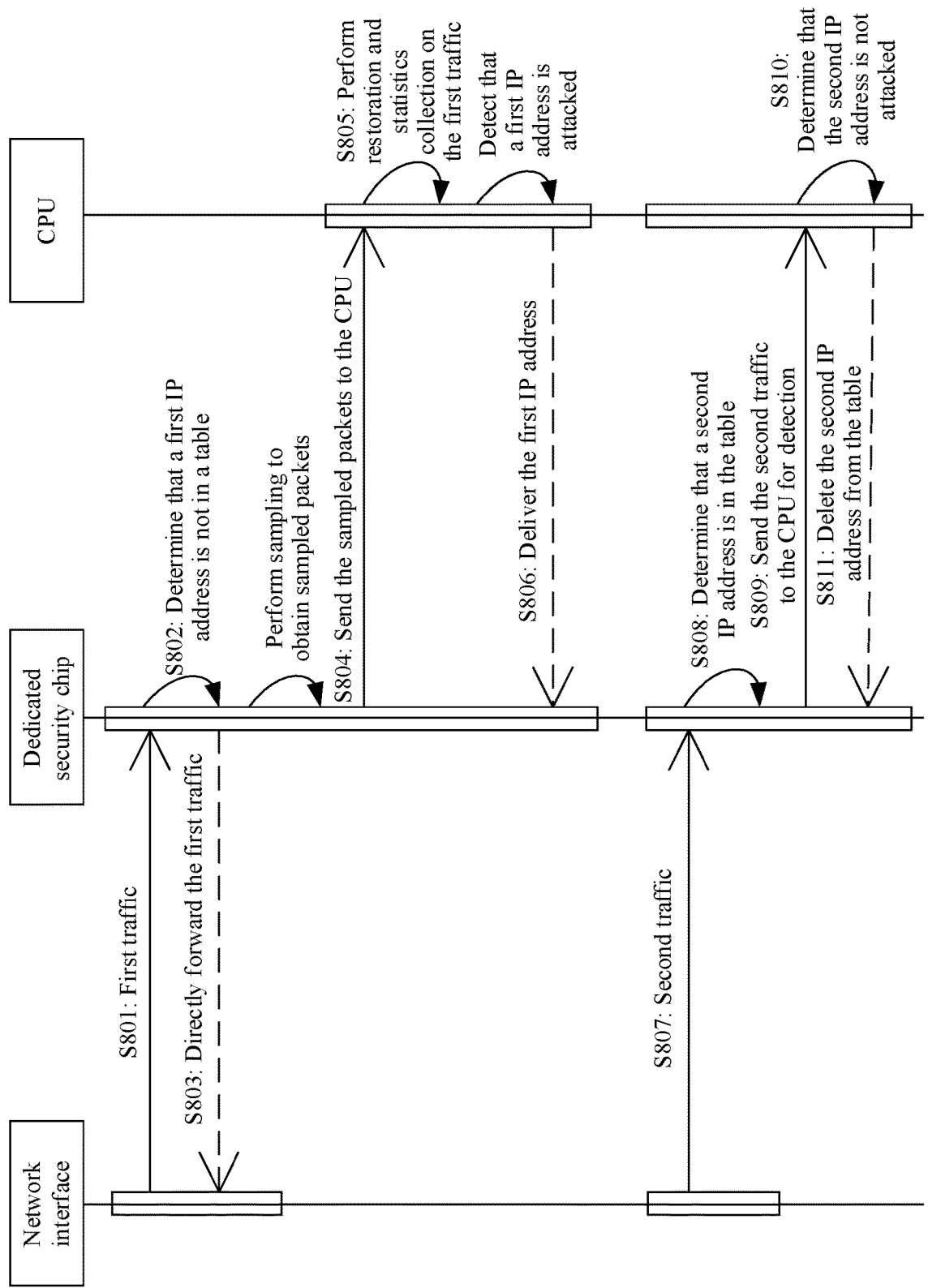
FIG. 8 is a flowchart of a traffic processing method according to an embodiment of this application.
Figure 9:
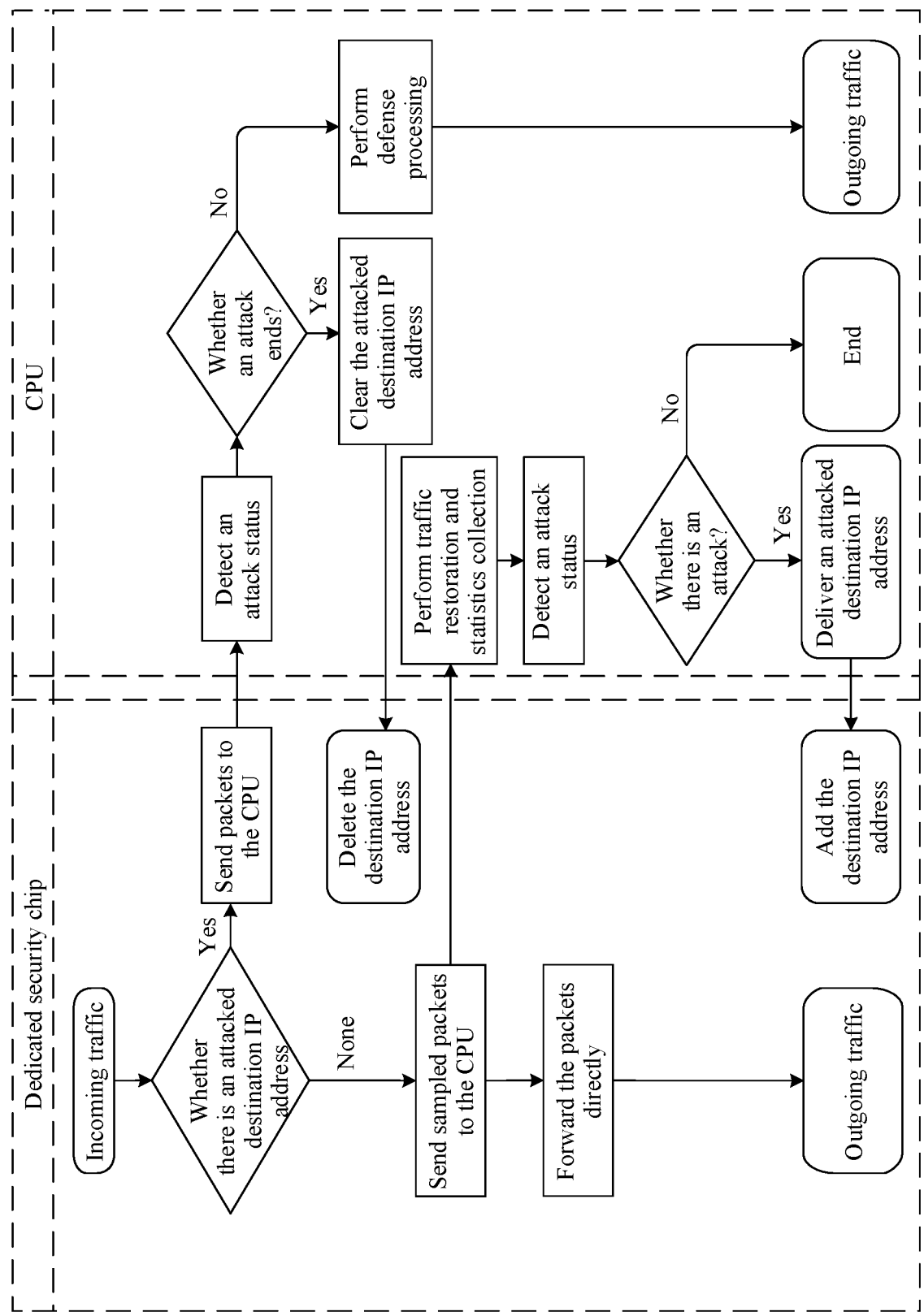
FIG. 9 is a flowchart of a traffic processing method according to an embodiment of this application.

More specifically, a flowchart of interaction between the network interface, the dedicated security chip, and the CPU in FIG. 7 is optionally shown in FIG. 8 and FIG. 9.

As shown in FIG. 8 and FIG. 9, a specific process of the interaction between the network interface, the dedicated security chip, and the CPU in Example 1 includes, for example, the following step S801 to step S811.

Step S801: First traffic first enters a dedicated security chip through a network interface for processing, where a destination IP address of the first traffic includes a first IP address.

Step S802: The dedicated security chip maintains a list (a one-dimensional array or a hash conflict linked list, corresponding to the first destination IP table described above) of destination IP addresses having a risk of being attacked. The dedicated security chip obtains a destination IP address in a packet in the first traffic, to obtain the first IP address. The dedicated security chip searches whether the first IP address exists in an attacked destination IP address list.

Step S803: If the first IP address does not exist on the dedicated security chip, the dedicated security chip forwards the first traffic by searching for a packet-by-packet searching route or searching for a session. In addition, the dedicated security chip further performs the following step S804.

Step S804: The dedicated security chip samples the first traffic to obtain sampled packets, and sends the sampled packets to the CPU for restoration and statistics collection processing before step S805 is performed.

Step S805: After the sampled packets are sent to the CPU, the CPU restores the traffic based on a sampling ratio, to determine whether the first IP address is attacked.

Step S806: If it is detected that the first IP address is attacked, the CPU delivers a message to indicate the dedicated security chip to add the first IP address to the attacked destination IP address list. After receiving the message from the CPU, the dedicated security chip adds the first IP address to the attacked destination IP address list.

Step S807: Second traffic first enters the dedicated security chip through a network interface for processing, where a destination IP address of the second traffic includes a second IP address.

Step S808: The dedicated security chip obtains a destination IP address in a packet in the second traffic, to obtain the second IP address. The dedicated security chip searches whether the second IP address exists in the attacked destination IP address list.

Step S809: If the second IP address exists in the attacked destination IP address list, the dedicated security chip directly sends the second traffic to the CPU.

Step S810: After the second traffic is sent to the CPU, the CPU collects statistics on the second traffic, and performs attack detection on the second traffic. After the CPU determines attack packets and normal service packets in the second traffic through attack detection, the CPU sends the normal service packets in the second traffic to the second network interface, to send the normal service packets in the second traffic to a destination through the second network interface. In addition, the CPU discards the attack packets in the second traffic, to block transmission of the attack packets in the second traffic.

Step S811: If no attack on the second IP address is detected, for a continuous period of time, in the traffic that is sent from the dedicated security chip and whose destination address is the second IP address, the CPU delivers a message to indicate the dedicated security chip to delete the second IP address from the attacked destination IP address list. After receiving the message from the CPU, the dedicated security chip deletes the second IP address from the attacked destination IP address list.

FIG. 8 is described by using an example in which the dedicated security chip performs traffic distribution control based on the destination IP address. For an embodiment in which traffic distribution control is performed based on a source IP address, the first IP address in the embodiment shown in FIG. 8 may be replaced with a source IP address of the first traffic. In the method shown in FIG. 8, the second IP address may be replaced with a source IP address of the second traffic. In the method shown in FIG. 8, the attacked destination IP address list may be replaced with an attacked source IP address list, or replaced with a specially specified protected source IP address list, or replaced with a specially specified protected destination IP address list.

The destination IP table in the foregoing embodiments includes an IP address having a risk of being attacked. Alternatively, the destination IP table does not include an IP address having a risk of being attacked, but includes an IP address having no risk of being attacked. The following describes the processing process when the destination IP address table includes an IP address having no risk of being attacked. To distinguish between different destination IP tables, a "second destination IP table" is used to describe a table including an IP address having no risk of being attacked.

Figure 10:
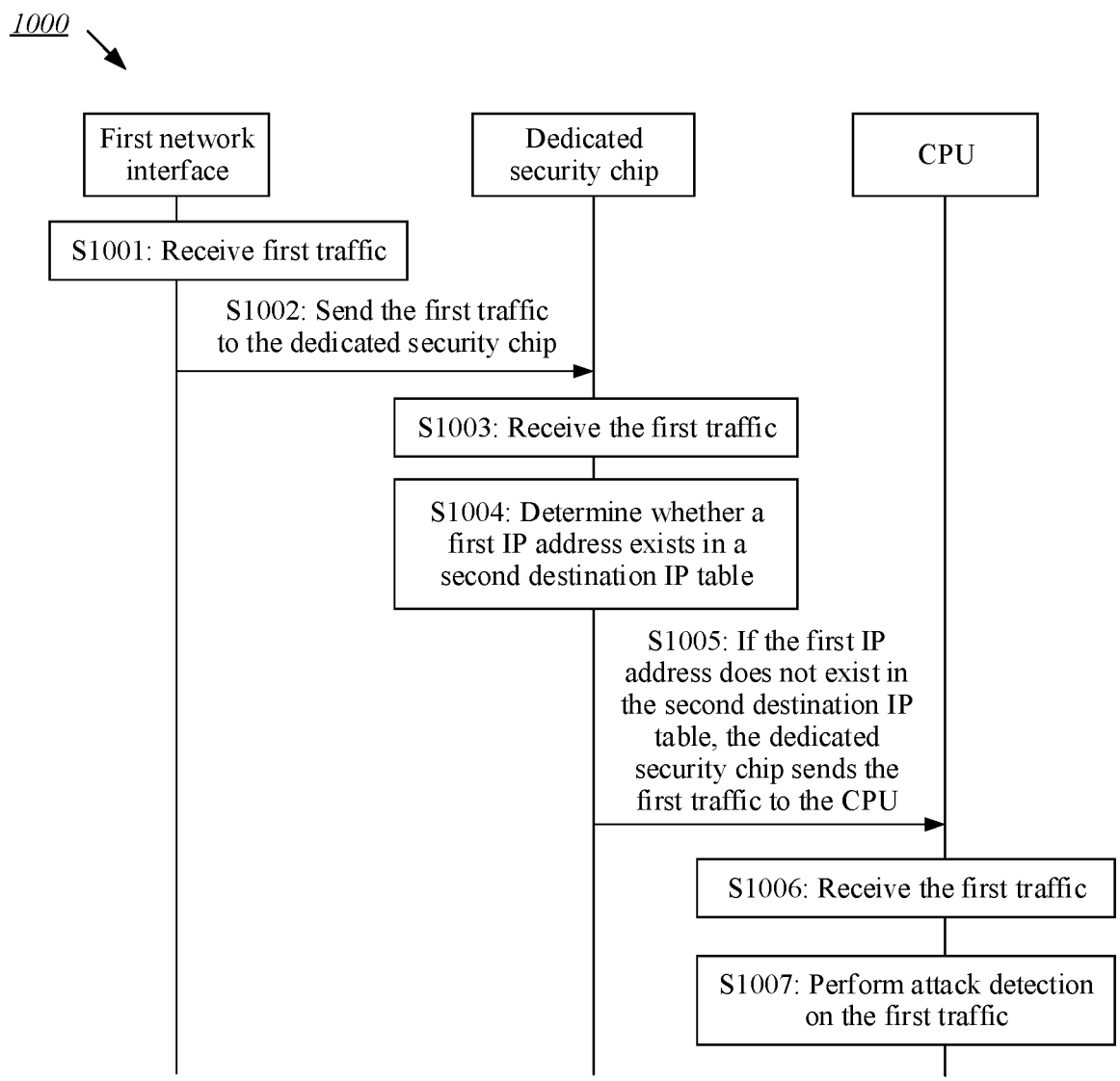
FIG. 10 is a flowchart of a traffic processing method according to an embodiment of this application.

FIG. 10 is a flowchart of a traffic processing method 1000 according to an embodiment of this application. The method 1000 includes the following step S1001 to step S1007.

Step S1001: A first network interface of a protection device receives first traffic from a first network device.

Step S1002: The first network interface sends the first traffic to a dedicated security chip.

Step S1003: The dedicated security chip receives the first traffic from the first network interface of the protection device.

Step S1004: The dedicated security chip determines whether a first IP address exists in a second destination IP table stored on the dedicated security chip. The second destination IP table includes at least one IP address having no risk of being attacked.

Step S1005: If the first IP address does not exist in the second destination IP table, the dedicated security chip sends the first traffic to the CPU.

Step S1006: The CPU receives the first traffic from the dedicated security chip.

Step S1007: The CPU performs attack detection on the first traffic.

Optionally, in the method 1000, after the CPU performs step S1007 to detect attack packets in the first traffic and normal service packets in the first traffic, the CPU discards attack packets in the first traffic, and the CPU sends the normal service packets in the first traffic to the second network interface. The second network interface sends the normal service packets in the first traffic to a second network device, and further the second network device forwards the normal service packets in the first traffic to a destination.

In the method 1000, the dedicated security chip is combined with the CPU, and the dedicated security chip sends, to the CPU, traffic whose destination IP address is not in a table (the second destination IP address table) of IP addresses having no risk of being attacked, so that the CPU further defends against traffic having an attack risk. This helps resolve a problem that exists when only a dedicated security chip or only a CPU is used for attack defense. Therefore, effectiveness and integrity of defense are improved.

The foregoing describes actions performed by the dedicated security chip when the first IP address does not exist in the second destination IP table. Actions performed by the dedicated security chip when the first IP address exists in the second destination IP table are optionally shown in FIG. 11.

Figure 11:
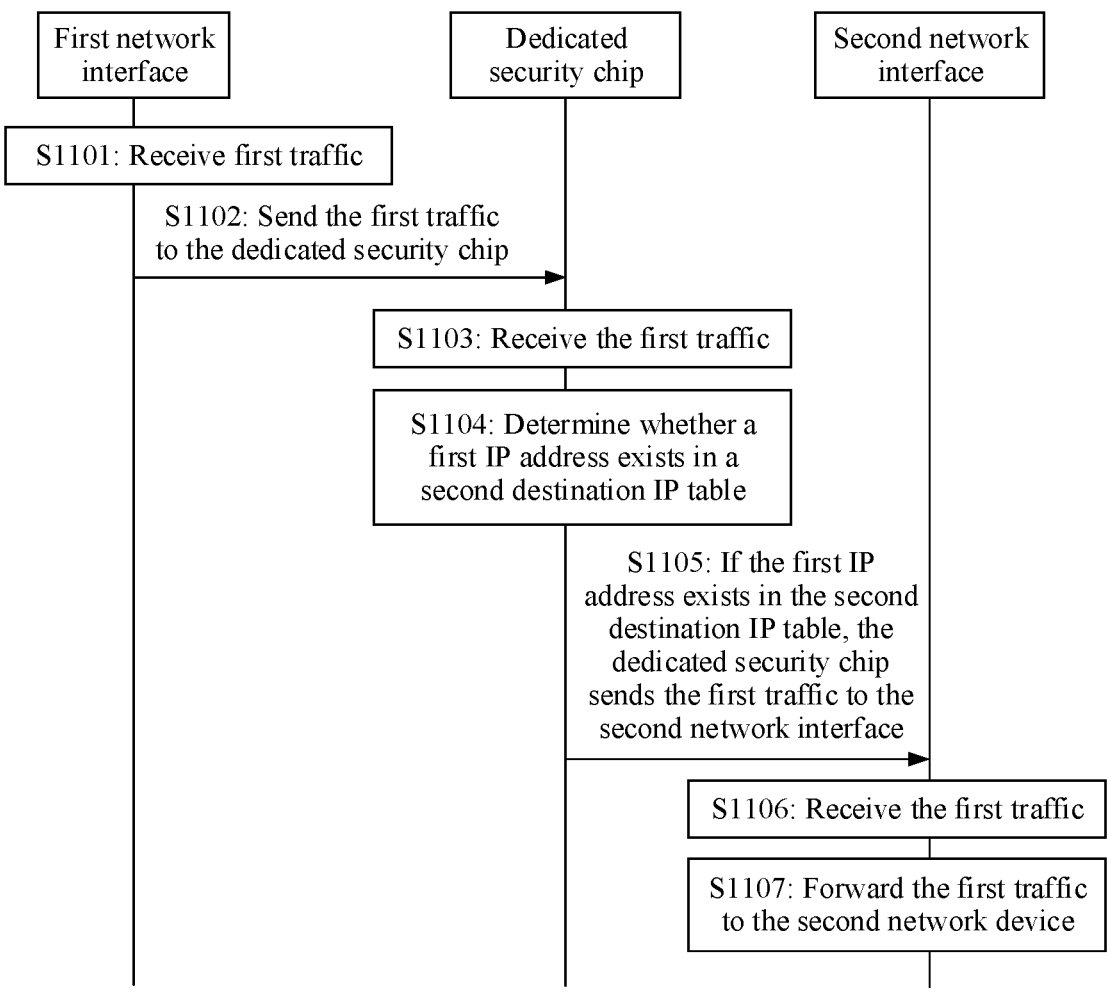
FIG. 11 is a flowchart of a traffic processing method according to an embodiment of this application.

A method 1100 shown in FIG. 11 includes step S1101 to step S1107.

Step S1101: A first network interface of a protection device receives first traffic from a first network device.

Step S1102: The first network interface sends the first traffic to a dedicated security chip.

Step S1103: The dedicated security chip receives the first traffic from the first network interface of the protection device.

Step S1104: The dedicated security chip determines whether the first IP address exists in a second destination IP table stored on the dedicated security chip, where the second destination IP table includes at least one IP address having no risk of being attacked.

Step S1105: If the first IP address exists in the second destination IP table, the dedicated security chip sends the first traffic to a second network interface of the protection device.

Step S1106: The second network interface receives the first traffic sent by the dedicated security chip.

Step S1107: The second network interface forwards the first traffic to the second network device.

In the method 1100, normal traffic (that is, traffic whose destination IP address is an IP address having no risk of being attacked) is directly forwarded by the dedicated security chip instead of being sent to the CPU. Therefore, forwarding burden of the CPU on normal traffic is reduced, and traffic destined for an IP address having no risk of being attacked is not affected when the CPU rushes high. In addition, high-performance hardware of the dedicated security chip can be used to implement fast traffic forwarding, so that overall forwarding performance of the protection device is improved.

Optionally, the embodiments shown in FIG. 1 and FIG. 11 also support a self-update mechanism of the destination IP table. The following also uses an example in which the first IP address is used as a destination IP address to describe how to update the second destination IP table.

Figure 12:
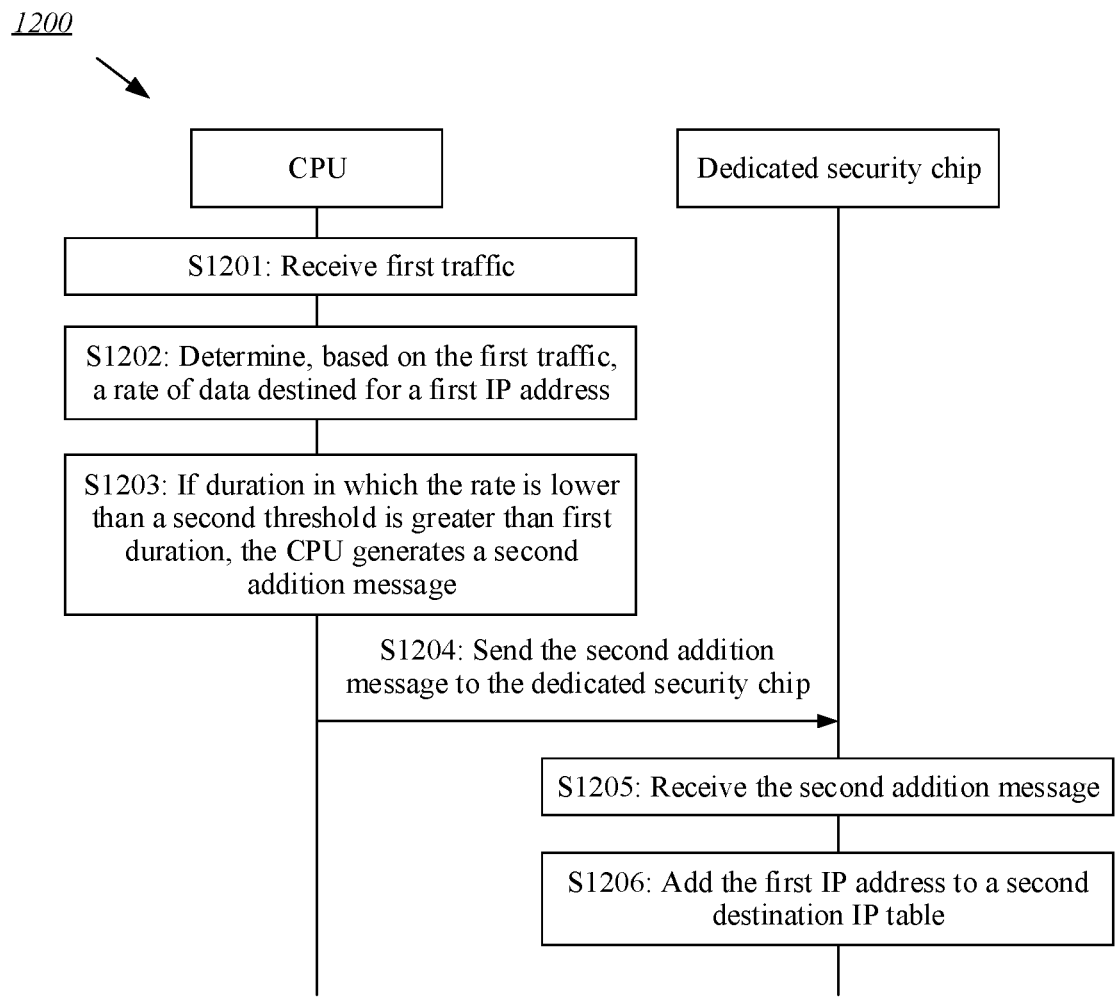
FIG. 12 is a flowchart of a traffic processing method according to an embodiment of this application.

A process of adding the first IP address to the second destination IP table is optionally shown in FIG. 12. A method 1200 shown in FIG. 12 includes step S1201 to step S1206.

Step S1201: A CPU receives first traffic from a dedicated security chip.

Step S1202: The CPU determines, based on the first traffic, a rate of data destined for a first IP address.

Step S1203: If duration in which the rate is lower than a second threshold is greater than first duration, the CPU generates a second addition message.

The second threshold is a rate threshold. Optionally, the second threshold is equal to the first threshold, or optionally, the second threshold is unequal to the first threshold. The second addition message includes the first IP address, where the second addition message indicates to add the first IP address to the second destination IP table.

Step S1204: The CPU sends the second addition message to the dedicated security chip.

Step S1205: The dedicated security chip receives a second addition message from the CPU, where the second addition message includes the first IP address, and the second addition message indicates to add the first IP address to the second destination IP table.

Step S1206: The dedicated security chip adds the first IP address to the second destination IP table in response to the second addition message.

Figure 13:
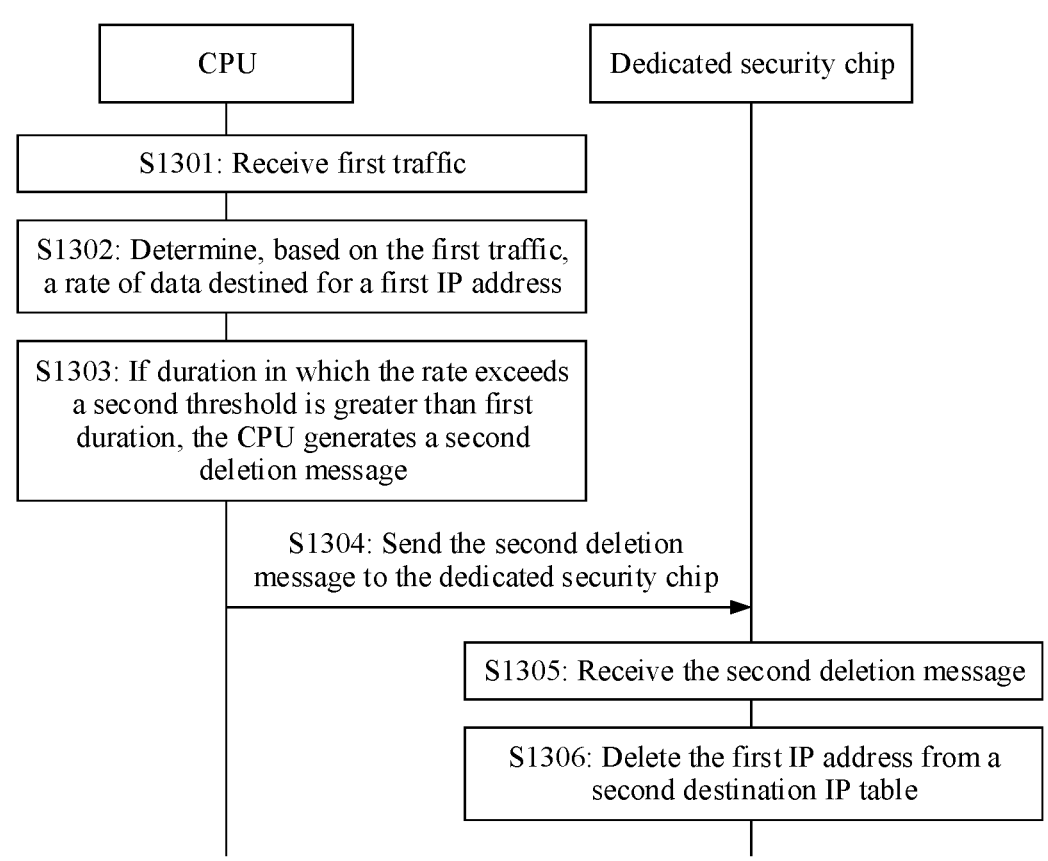
FIG. 13 is a flowchart of a traffic processing method according to an embodiment of this application.

A process of deleting the first IP address from the second destination IP table is optionally shown in FIG. 13. A method 1300 shown in FIG. 13 includes step S1301 to step S1306.

Step S1301: A CPU receives first traffic from a dedicated security chip.

Step S1302: The CPU determines, based on the first traffic, a rate of data destined for a first IP address.

Step S1303: If duration in which the rate exceeds a second threshold is greater than first duration, the CPU generates a second deletion message.

The second deletion message indicates to delete the first IP address from a second destination IP table.

Step S1304: The CPU sends the second deletion message to the dedicated security chip.

Step S1305: The dedicated security chip receives the second deletion message from the CPU.

Step S1306: The dedicated security chip deletes the first IP address from the second destination IP table in response to the second deletion message.

Optionally, in the methods shown in FIG. 12 and FIG. 13, the CPU also implements statistics collection on the rate based on a sampling and restoration mechanism. For the sampling and restoration mechanism, refer to the foregoing description. Details are not described herein.

The defense mechanism based on the first destination IP table and the defense mechanism based on the second destination IP table are described above. In some embodiments, the two mechanisms are combined with each other, that is, the first destination IP table and the second destination IP table coexist. In a possible implementation in a case of coexistence, the dedicated security chip first queries the first destination IP table and then queries the second destination IP table. The following provides specific descriptions with reference to FIG. 14 and FIG. 15.

Figure 14:
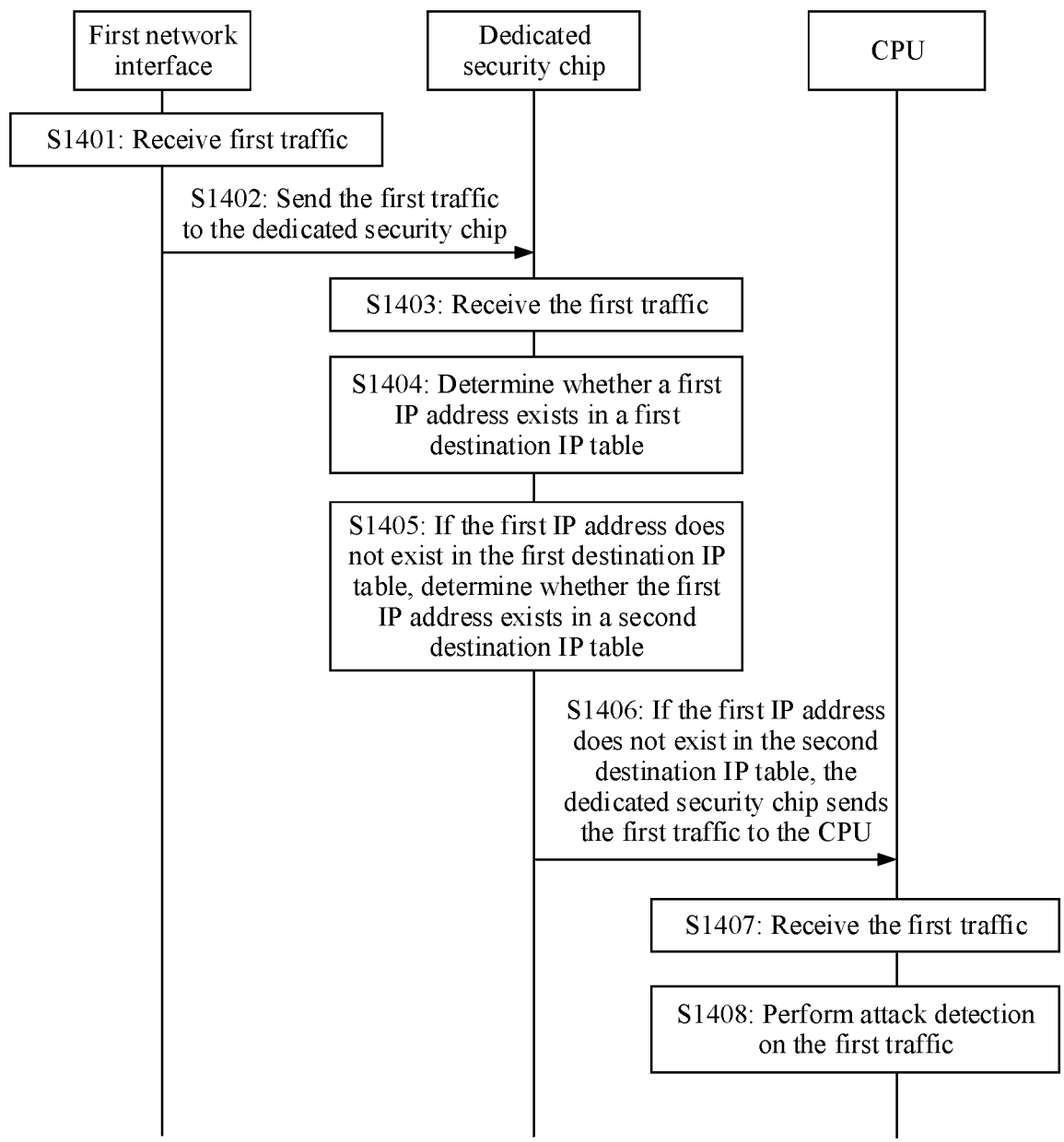
FIG. 14 is a flowchart of a traffic processing method according to an embodiment of this application.

A method 1400 shown in FIG. 14 includes step S1401 to step S1408.

Step S1401: A first network interface of a protection device receives first traffic from a first network device.

Step S1402: The first network interface sends the first traffic to a dedicated security chip.

Step S1403: The dedicated security chip receives the first traffic from the first network interface of the protection device.

Step S1404: The dedicated security chip determines whether the first IP address exists in a first destination IP table stored on the dedicated security chip.

Step S1405: If the first IP address does not exist in the first destination IP table, the dedicated security chip determines whether a first IP address exists in a second destination IP table stored on the dedicated security chip.

Step S1406: If the first IP address does not exist in the second destination IP table, the dedicated security chip sends the first traffic to the CPU.

Step S1407: The CPU receives the first traffic from the dedicated security chip.

Step S1408: The CPU performs attack detection on the first traffic.

Optionally, in the method 1400, after the CPU performs step S1408 to detect attack packets in the first traffic and normal service packets in the first traffic, the CPU discards attack packets in the first traffic, and the CPU sends the normal service packets in the first traffic to the second network interface. The second network interface sends the normal service packets in the first traffic to a second network device, and further the second network device forwards the normal service packets in the first traffic to a destination.

Figure 15:
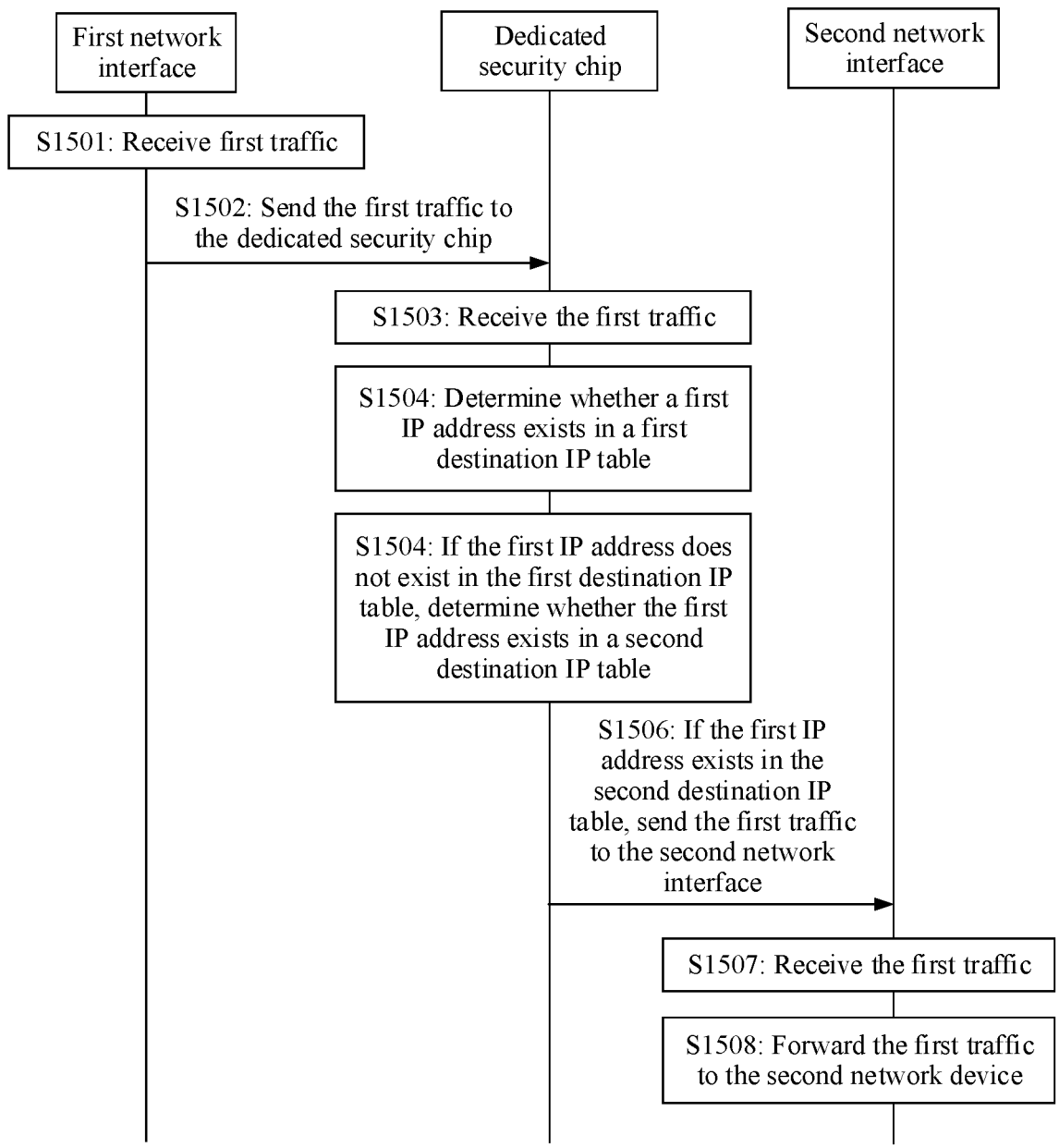
FIG. 15 is a flowchart of a traffic processing method according to an embodiment of this application.

A method 1500 shown in FIG. 15 includes step S1501 to step S1508.

Step S1501: A first network interface of a protection device receives first traffic from a first network device.

Step S1502: The first network interface sends the first traffic to a dedicated security chip.

Step S1503: The dedicated security chip receives the first traffic from the first network interface of the protection device.

Step S1504: The dedicated security chip determines whether the first IP address exists in a first destination IP table stored on the dedicated security chip.

Step S1505: If the first IP address does not exist in the first destination IP table, the dedicated security chip determines whether a first IP address exists in a second destination IP table stored on the dedicated security chip.

Step S1506: If the first IP address exists in the second destination IP table, the dedicated security chip sends the first traffic to a second network interface of the protection device.

Step S1507: The second network interface receives the first traffic sent by the dedicated security chip.

Step S1508: The second network interface forwards the first traffic to the second network device.

The term traffic in embodiments of this application is also referred to as network traffic or data traffic. Traffic refers to data transmitted through a network at a given time point. For example, traffic received by a device at a time point T refers to all packets received by the device at the time point T.

Embodiments in this specification are all described in a progressive manner. For same or similar parts in embodiments, reference may be made to these embodiments, and each embodiment focuses on a difference from other embodiments.

In the specification and claims of embodiments of this application, the terms "first", "second", and the like are intended to distinguish between different objects, but do not indicate a particular order of the objects, and cannot be understood as indicating or implying relative importance. For example, the first destination IP table and the second destination IP table are used to distinguish between different destination IP tables, but are not used to describe a particular order of the destination IP tables, and cannot be understood as an indication that the first destination IP table is more important than the second destination IP table.

In the descriptions of embodiments of this application, unless otherwise specified, "at least one" means one or more. "A plurality of" means two or more than two. For example, the at least one IP address having a risk of being attacked refers to one or more IP addresses having a risk of being attacked.

"For A, refer to B" means that A is the same as B, or A is a simple variant of B.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the processes or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

Embodiments of the present invention are summarized here. Other embodiments can also be understood from the entirety of the specification and the claims filed herein.

Example 1. A method for processing traffic in a protection device, where the protection device includes a central processing unit CPU and a dedicated security chip, and the method includes: receiving, by the dedicated security chip, first traffic from a first network interface of the protection device, where the first network interface is configured to receive traffic sent by a first network device, and a destination internet protocol IP address of the first traffic includes a first IP address; determining, by the dedicated security chip, whether the first IP address exists in a first destination IP table stored on the dedicated security chip, where the first destination IP table includes at least one IP address having a risk of being attacked; and if the first IP address exists in the first destination IP table, sending, by the dedicated security chip, the first traffic to the CPU.

Example 2. The method according to example 1, where the method further includes: if the first IP address does not exist in the first destination IP table, sending, by the dedicated security chip, the first traffic to a second network interface of the protection device, so that the second network interface forwards the first traffic to a second network device.

Example 3. The method according to example 2, where if the first IP address does not exist in the first destination IP table, the method further includes: sampling, by the dedicated security chip, the first traffic to obtain sampled packets, and sending, by the dedicated security chip, the sampled packets to the CPU.

Example 4. The method according to example 3, where the sampling, by the dedicated security chip, the first traffic to obtain sampled packets includes: selecting, by the dedicated security chip, the sampled packets from the first traffic based on a sampling ratio, where the sampling ratio indicates a ratio of a quantity of packets included in the first traffic to a quantity of the sampled packets.

Example 5. The method according to example 3, where after the sending, by the dedicated security chip, the sampled packets to the CPU, the method further includes: receiving, by the dedicated security chip, a first addition message from the CPU, where the first addition message includes the first IP address, and the first addition message indicates to add the first IP address to the first destination IP table; and adding, by the dedicated security chip, the first IP address to the first destination IP table.

Example 6. The method according to example 1, where after the sending, by the dedicated security chip, the first traffic to the CPU, the method further includes: receiving, by the dedicated security chip, a first deletion message from the CPU, where the first deletion message indicates to delete the first IP address from the first destination IP table; and deleting, by the dedicated security chip, the first IP address from the first destination IP table.

Example 7. The method according to example 1, where the method further includes: if the first destination IP address does not exist in the first destination IP table, determining, by the dedicated security chip, whether the first IP address exists in a second destination IP table stored on the dedicated security chip, where the second destination IP table includes at least one IP address having no risk of being attacked; and if the first IP address exists in the second destination IP table, sending, by the dedicated security chip, the first traffic to a second network interface of the protection device, so that the second network interface forwards the first traffic to a second network device; or if the first IP address does not exist in the second destination IP table, sending, by the dedicated security chip, the first traffic to the CPU.

Example 8. The method according to any one of examples 1 to 7, where the dedicated security chip includes at least one of an application-specific integrated circuit ASIC, a field programmable gate array FPGA, or a network processor NP.

Example 9. A method for processing traffic in a protection device, where the protection device includes a central processing unit CPU and a dedicated security chip, and the method includes: receiving, by the dedicated security chip, first traffic from a first network interface of the protection device, where the first network interface is configured to receive traffic sent by a first network device, and a destination internet protocol IP address of the first traffic includes a first IP address; determining, by the dedicated security chip, whether the first IP address exists in a second destination IP table stored on the dedicated security chip, where the second destination IP table includes at least one IP address having no risk of being attacked; and if the first IP address does not exist in the second destination IP table, sending, by the dedicated security chip, the first traffic to the CPU.

Example 10. The method according to example 9, where the method further includes: if the first IP address exists in the second destination IP table, sending, by the dedicated security chip, the first traffic to a second network interface of the protection device, so that the second network interface forwards the first traffic to a second network device.

Example 11. The method according to example 10, where if the first IP address exists in the second destination IP table, the method further includes: sampling, by the dedicated security chip, the first traffic to obtain sampled packets, and sending, by the dedicated security chip, the sampled packets to the CPU.

Example 12. The method according to example 11, where after the sending, by the dedicated security chip, the sampled packets to the CPU, the method further includes: receiving, by the dedicated security chip, a second deletion message from the CPU, where the second deletion message indicates to delete the first IP address from the second destination IP table; and deleting, by the dedicated security chip, the first IP address from the second destination IP table.

Example 13. The method according to example 9, where after the sending, by the dedicated security chip, the first traffic to the CPU, the method further includes: receiving, by the dedicated security chip, a second addition message from the CPU, where the second addition message includes the first IP address, and the second addition message indicates to add the first IP address to the second destination IP table; and adding, by the dedicated security chip, the first IP address to the second destination IP table.

Example 14. A method for processing traffic in a protection device, where the protection device includes a central processing unit CPU and a dedicated security chip, and the method includes: receiving, by the CPU, first traffic from the dedicated security chip; determining, by the CPU based on the first traffic, a rate of data destined for a first internet protocol IP address; if duration in which the rate meets a threshold condition is greater than first duration, generating, by the CPU, an addition message, where the addition message includes the first IP address, and the addition message indicates to add the first IP address to a destination IP table that is stored on the dedicated security chip; and sending, by the CPU, the addition message to the dedicated security chip.

Example 15. The method according to example 14, where that the rate meets a threshold condition includes: the rate exceeds a first threshold; the destination IP table includes a first destination IP table, where the first destination IP table includes at least one IP address having a risk of being attacked; and the addition message includes a first addition message, where the first addition message indicates to add the first IP address to the first destination IP table.

Example 16. The method according to example 15, where after the CPU sends the first addition message to the dedicated security chip, the method further includes: if duration in which the rate does not meet the threshold condition is greater than second duration, generating, by the CPU, a first deletion message, where the first deletion message indicates to delete the first IP address from the first destination IP table; and sending, by the CPU, the first deletion message to the dedicated security chip.

Example 17. The method according to example 14, where that the rate meets a threshold condition includes: the rate is lower than a second threshold; the destination IP table includes a second destination IP table, where the second destination IP table includes at least one IP address having no risk of being attacked; and the addition message includes a second addition message, where the second addition message indicates to add the first IP address to the second destination IP table.

Example 18. The method according to example 17, where after the CPU sends the second addition message to the dedicated security chip, the method further includes: if duration in which the rate does not meet the threshold condition is greater than second duration, generating, by the CPU, a second deletion message, where the second deletion message indicates to delete the first IP address from the second destination IP table; and sending, by the CPU, the second deletion message to the dedicated security chip.

Example 19. The method according to example 14, where the traffic from the dedicated security chip includes sampled packets, and the determining, by the CPU based on the first traffic, a rate of data destined for a first IP address includes: determining, by the CPU based on a rate at which the sampled packets are received and a sampling ratio, a rate of data destined for the first IP address, where the sampling ratio indicates a ratio of a quantity of packets included in the first traffic to a quantity of the sampled packets, and the rate is a product of the rate at which the sampled packets are received and the sampling ratio.

Example 20. The method according to any one of examples 14 to 19, where the first IP address is a destination IP address of a packet in the first traffic; or the first IP address is an IP address in the destination IP table.

Example 21. A method for processing traffic in a protection device, where the protection device includes a central processing unit CPU and a dedicated security chip, and the method includes: receiving, by the dedicated security chip, first traffic from a first network interface of the protection device, where the first network interface is configured to receive traffic sent by a first network device, and a source internet protocol IP address of the first traffic includes a first IP address; determining, by the dedicated security chip, whether the first IP address exists in a first source IP table stored on the dedicated security chip, where the first source IP table includes at least one IP address having a risk of being attacked; and if the first IP address exists in the first source IP table, sending, by the dedicated security chip, the first traffic to the CPU.

Example 22. A method for processing traffic in a protection device, where the protection device includes a central processing unit CPU and a dedicated security chip, and the method includes: receiving, by the dedicated security chip, first traffic from a first network interface of the protection device, where the first network interface is configured to receive traffic sent by a first network device, and a source internet protocol IP address of the first traffic includes a first IP address; determining, by the dedicated security chip, whether the first IP address exists in a second source IP table stored on the dedicated security chip, where the second source IP table includes at least one IP address having no risk of being attacked; and if the first IP address does not exist in the second source IP table, sending, by the dedicated security chip, the first traffic to the CPU.

Example 23. A method for processing traffic in a protection device, where the protection device includes a central processing unit CPU and a dedicated security chip, and the method includes: receiving, by the CPU, first traffic from the dedicated security chip; determining, by the CPU based on the first traffic, a rate of data coming from a first internet protocol IP address; if duration in which the rate meets a threshold condition is greater than first duration, generating, by the CPU, an addition message, where the addition message includes the first IP address, and the addition message indicates to add the first IP address to a source IP table that is stored on the dedicated security chip; and sending, by the CPU, the addition message to the dedicated security chip.

Example 24. A protection device, including a central processing unit CPU, a dedicated security chip, a first network interface, and a second network interface, where the first network interface is configured to: receive first traffic from a first network device, and send the first traffic to the dedicated security chip, where a destination internet protocol IP address of the first traffic includes a first IP address; the dedicated security chip is configured to: receive the first traffic from the first network interface, and determine whether the first IP address exists in a first destination IP table stored on the dedicated security chip, where the first destination IP table includes at least one IP address having a risk of being attacked; if the first IP address exists in the first destination IP table, the dedicated security chip is further configured to send the first traffic to the CPU; the CPU is configured to: perform attack detection on the first traffic sent by the dedicated security chip, and send traffic on which attack detection is performed to the second network interface; and the second network interface is configured to forward the traffic on which attack detection is performed to a second network device.

Example 25. The protection device according to example 24, where if the first IP address does not exist in the first destination IP table, the dedicated security chip is further configured to send the first traffic to the second network interface; and the second network interface is further configured to forward the first traffic to the second network device.

Example 26. The protection device according to example 24, where the CPU is further configured to determine, based on the first traffic, a rate of data destined for the first IP address; and if duration in which the rate exceeds a first threshold is greater than first duration, the CPU is further configured to: generate a first addition message and send the first addition message to the dedicated security chip, where the dedicated security chip is further configured to add the first IP address to the first destination IP table based on the first addition message from the CPU, and the first addition message indicates to add the first IP address to the first destination IP table; or if duration in which the rate is lower than a first threshold is greater than second duration, the CPU is further configured to: generate a first deletion message and send the first deletion message to the dedicated security chip, where the dedicated security chip is further configured to delete the first IP address from the first destination IP table based on the first deletion message from the CPU, and the first deletion message indicates to delete the first IP address from the first destination IP table.

Example 27. The protection device according to example 26, where if the first IP address does not exist in the first destination IP table, the dedicated security chip is further configured to: sample the first traffic to obtain sampled packets, and send the sampled packets to the CPU; and the CPU is specifically configured to determine, based on the sampled packets, the rate of the data destined for the first IP address.

Example 28. The protection device according to example 27, where the dedicated security chip is specifically configured to select the sampled packets from the first traffic based on a sampling ratio, where the sampling ratio indicates a ratio of a quantity of packets included in the first traffic to a quantity of the sampled packets; and the CPU is specifically configured to determine, based on a rate at which the sampled packets are received and the sampling ratio, the rate of the data destined for the first IP address.

Example 29. The protection device according to example 24, where if the first destination IP address does not exist in the first destination IP table, the dedicated security chip is further configured to determine, whether the first IP address exists in a second destination IP table stored on the dedicated security chip, where the second destination IP table includes at least one IP address having no risk of being attacked; and if the first IP address exists in the second destination IP table, the dedicated security chip is further configured to send the first traffic to the second network interface; or if the first IP address does not exist in the second destination IP table, the dedicated security chip is further configured to send the first traffic to the CPU.

Example 30. The protection device according to any one of examples 24 to 29, where the dedicated security chip includes at least one of an application-specific integrated circuit ASIC, a field programmable gate array FPGA, or a network processor NP.

Example 31. A protection device, including a central processing unit CPU, a dedicated security chip, a first network interface, and a second network interface, where the first network interface is configured to: receive first traffic from a first network device, and send the first traffic to the dedicated security chip, where a destination internet protocol IP address of the first traffic includes a first IP address; the dedicated security chip is configured to receive the first traffic from the first network interface; the dedicated security chip is configured to determine whether the first IP address exists in a second destination IP table stored on the dedicated security chip, where the second destination IP table includes at least one IP address having no risk of being attacked; if the first IP address does not exist in the second destination IP table, the dedicated security chip is configured to send the first traffic to the CPU; the CPU is configured to: perform attack detection on the first traffic sent by the dedicated security chip, and send traffic on which attack detection is performed to the second network interface; and the second network interface is configured to forward the traffic on which attack detection is performed to a second network device.

Example 32. The protection device according to example 31, where if the first IP address exists in the second destination IP table, the dedicated security chip is further configured to send the first traffic to the second network interface; or the second network interface is further configured to forward the first traffic to the second network device.

Example 33. The protection device according to example 32, where the CPU is further configured to determine, based on the first traffic, a rate of data destined for the first IP address; and if duration in which the rate is lower than a first threshold is greater than first duration, the CPU is further configured to: generate a second addition message and send the second addition message to the dedicated security chip, where the dedicated security chip is further configured to add the first IP address to the second destination IP table based on the second addition message from the CPU, and the second addition message indicates to add the first IP address to the second destination IP table; or if duration in which the rate exceeds a first threshold is greater than second duration, the CPU is further configured to: generate a second deletion message and send the second deletion message to the dedicated security chip, where the dedicated security chip is further configured to delete the first IP address from the second destination IP table based on the second deletion message from the CPU, and the second deletion message indicates to delete the first IP address from the second destination IP table.

Example 34. A protection device, including a central processing unit CPU, a dedicated security chip, a first network interface, and a second network interface, where the first network interface is configured to: receive first traffic from a first network device, and send the first traffic to the dedicated security chip, where a source internet protocol IP address of the first traffic includes a first IP address; the dedicated security chip is configured to receive the first traffic from the first network interface; the dedicated security chip is configured to determine whether the first IP address exists in a first source IP table stored on the dedicated security chip, where the first source IP table includes at least one IP address having a risk of being attacked; if the first IP address exists in the first source IP table, the dedicated security chip is configured to send the first traffic to the CPU; the CPU is configured to: perform attack detection on the first traffic sent by the dedicated security chip, and send traffic on which attack detection is performed to the second network interface; and the second network interface is configured to forward the traffic on which attack detection is performed to a second network device.

Example 35. The protection device according to example 34, where if the first IP address does not exist in the first source IP table, the dedicated security chip is further configured to send the first traffic to the second network interface; and the second network interface is further configured to forward the first traffic to the second network device.

Example 36. The protection device according to example 34, where the CPU is configured to determine, based on the first traffic, a rate of data coming from the first IP address; and if duration in which the rate exceeds a first threshold is greater than first duration, the CPU is further configured to: generate a first addition message and send the first addition message to the dedicated security chip, where the dedicated security chip is further configured to add the first IP address to the first source IP table based on the first addition message from the CPU, and the first addition message indicates to add the first IP address to the first source IP table; or if duration in which the rate is lower than a first threshold is greater than second duration, the CPU is further configured to: generate a first deletion message and send the first deletion message to the dedicated security chip, where the dedicated security chip is further configured to delete the first IP address from the first source IP table based on the first deletion message from the CPU, and the first deletion message indicates to delete the first IP address from the first source IP table.

Example 37. A protection device, including a central processing unit CPU, a dedicated security chip, a first network interface, and a second network interface, where the first network interface is configured to: receive first traffic from a first network device, and send the first traffic to the dedicated security chip, where a source internet protocol IP address of the first traffic includes a first IP address; the dedicated security chip is configured to receive the first traffic from the first network interface; the dedicated security chip is configured to determine whether the first IP address exists in a second source IP table stored on the dedicated security chip, where the second source IP table includes at least one IP address having no risk of being attacked; if the first IP address does not exist in the second source IP table, the dedicated security chip is configured to send the first traffic to the CPU; the CPU is configured to: perform attack detection on the first traffic sent by the dedicated security chip, and send traffic on which attack detection is performed to the second network interface; and the second network interface is configured to forward the traffic on which attack detection is performed to a second network device.

Example 38. The protection device according to example 37, where if the first IP address exists in the second source IP table, the dedicated security chip is further configured to send the first traffic to the second network interface; and the second network interface is further configured to forward the first traffic to the second network device.

Example 39. The protection device according to example 37, where the CPU is configured to determine, based on the first traffic, a rate of data coming from the first IP address; and if duration in which the rate is lower than a first threshold is greater than first duration, the CPU is further configured to: generate a second addition message and send the second addition message to the dedicated security chip, where the dedicated security chip is further configured to add the first IP address to the second source IP table based on the second addition message from the CPU, and the second addition message indicates to add the first IP address to the second source IP table; or if duration in which the rate exceeds a first threshold is greater than second duration, the CPU is further configured to: generate a second deletion message and send the second deletion message to the dedicated security chip, where the dedicated security chip is further configured to delete the first IP address from the second source IP table based on the second deletion message from the CPU, and the second deletion message indicates to delete the first IP address from the second source IP table.

Example 40. A chip, including a memory and a processor, where the memory is configured to store computer instructions, and the processor is configured to invoke the computer instructions from the memory and run the computer instructions, to perform the traffic processing method according to any one of examples 1 to 13, 21, and 22.

In conclusion, the foregoing embodiments are merely intended for describing the technical solutions of this application, rather than limiting this application. Although this application is described in detail with reference to the foregoing embodiments, a person of ordinary skill in the art should understand that modifications may still be made to the technical solutions described in the foregoing embodiments, or equivalent replacements may still be made to some technical features thereof. These modifications or replacements do not make the essence of the corresponding technical solutions depart from the scope of the technical solutions of embodiments of this application.

What is claimed is:

1. A method for processing traffic in a protection device, wherein the protection device comprises a central processing unit (CPU) and a dedicated security chip, and the method comprises:
receiving, by the dedicated security chip, first traffic from a first network interface of the protection device, wherein the first network interface is configured to receive traffic sent by a first network device, and a destination internet protocol (IP) address of the first traffic comprises a first IP address;
determining, by the dedicated security chip, whether the first IP address exists in a first destination IP table stored on the dedicated security chip, wherein the first destination IP table comprises at least one IP address having a risk of being attacked;
in response to a determination that the first IP address exists in the first destination IP table, sending, by the dedicated security chip, the first traffic to the CPU; and
in response to a determination that the first IP address does not exist in the first destination IP table:
sending, by the dedicated security chip, the first traffic to a second network interface of the protection device, so that the second network interface forwards the first traffic to a second network device,
sampling, by the dedicated security chip, the first traffic to obtain sampled packets, and
sending, by the dedicated security chip, the sampled packets to the CPU.

2. The method according to claim 1, wherein sampling, by the dedicated security chip, the first traffic to obtain sampled packets comprises:
selecting, by the dedicated security chip, the sampled packets from the first traffic based on a sampling ratio, wherein the sampling ratio indicates a ratio of a quantity of packets comprised in the first traffic to a quantity of the sampled packets.

3. The method according to claim 1, further comprising:
after sending, by the dedicated security chip, the sampled packets to the CPU:
receiving, by the dedicated security chip, a first addition message from the CPU, wherein the first addition message comprises the first IP address, and the first addition message comprises a request to add the first IP address to the first destination IP table; and
adding, by the dedicated security chip, the first IP address to the first destination IP table.

4. The method according to claim 1, further comprising:
after the sending, by the dedicated security chip, the first traffic to the CPU:
receiving, by the dedicated security chip, a first deletion message from the CPU, wherein the first deletion message comprises a request to delete the first IP address from the first destination IP table; and
deleting, by the dedicated security chip, the first IP address from the first destination IP table.

5. The method according to claim 1, wherein the method further comprises:
in response to a determination that the first IP address does not exist in the first destination IP table, determining, by the dedicated security chip, whether the first IP address exists in a second destination IP table stored on the dedicated security chip, wherein the second destination IP table comprises at least one unattacked IP address or an IP address not specified to be protected; and
in response to a determination that the first IP address exists in the second destination IP table, sending, by the dedicated security chip, the first traffic to the second network interface of the protection device, so that the second network interface forwards the first traffic to the second network device; or
in response to a determination that the first IP address does not exist in the second destination IP table, sending, by the dedicated security chip, the first traffic to the CPU.

6. The method according to claim 1, wherein the dedicated security chip comprises at least one of an application-specific integrated circuit (ASIC), ASIC, a field programmable gate array (FPGA), or a network processor (NP).

7. A method for processing traffic in a protection device, wherein the protection device comprises a central processing unit (CPU) and a dedicated security chip, and the method comprises:
receiving, by the CPU, first traffic from the dedicated security chip;

determining, by the CPU based on the first traffic, a rate of data destined for a first internet protocol (IP) address;

in response to a determination that a duration in which the rate meets a threshold condition is greater than a first duration, generating, by the CPU, an addition message, wherein the addition message comprises the first IP address, and the addition message comprises a request to add the first IP address to a destination IP table that is stored on the dedicated security chip; and sending, by the CPU, the addition message to the dedicated security chip.

8. The method according to claim 7, wherein the threshold condition comprises the rate exceeding a first threshold;

the destination IP table comprises a first destination IP table, wherein the first destination IP table comprises at least one IP address having a risk of being attacked; and the addition message comprises a first addition message, wherein the first addition message comprises a request to add the first IP address to the first destination IP table.

9. The method according to claim 8, further comprising:

after the CPU sends the first addition message to the dedicated security chip:

in response to a determination that a duration in which the rate does not meet the threshold condition is greater than a second duration, generating, by the CPU, a first deletion message, wherein the first deletion message comprises a request to delete the first IP address from the first destination IP table; and sending, by the CPU, the first deletion message to the dedicated security chip.

10. The method according to claim 7, wherein the threshold condition comprises the rate being lower than a second threshold;

the destination IP table comprises a second destination IP table, wherein the second destination IP table comprises at least one unattacked IP address or an IP address not specified to be protected; and the addition message comprises a second addition message, wherein the second addition message comprises a request to add the first IP address to the second destination IP table.

11. The method according to claim 10, wherein after the CPU sends the second addition message to the dedicated security chip, the method further comprises:

in response to a determination that a duration in which the rate does not meet the threshold condition is greater than a second duration, generating, by the CPU, a second deletion message, wherein the second deletion message comprises a request to delete the first IP address from the second destination IP table; and sending, by the CPU, the second deletion message to the dedicated security chip.

12. The method according to claim 7, wherein:

the first traffic from the dedicated security chip comprises sampled packets; and determining, by the CPU based on the first traffic, the rate of data destined for the first IP address comprises:

determining, by the CPU, the rate of data destined for the first IP address based on a rate at which the sampled packets are received and a sampling ratio, wherein the sampling ratio indicates a ratio of a quantity of packets comprised in the first traffic to a quantity of the sampled packets, and the rate of data destined for the first IP address is a product of the rate at which the sampled packets are received and the sampling ratio.

13. The method according to claim 7, wherein:

the first IP address is a destination IP address of a packet in the first traffic; or the first IP address is an IP address in the destination IP table.

14. The method according to claim 7, wherein the dedicated security chip comprises at least one of an application-specific integrated circuit (ASIC), ASIC, a field programmable gate array (FPGA), or a network processor (NP).

15. A protection device, comprising:

a central processing unit (CPU);

a dedicated security chip;

a first network interface; and a second network interface, wherein the first network interface is configured to: receive first traffic from a first network device, and send the first traffic to the dedicated security chip, wherein a destination internet protocol (IP) address of the first traffic comprises a first IP address, the dedicated security chip is configured to: receive the first traffic from the first network interface, and determine whether the first IP address exists in a first destination IP table stored on the dedicated security chip, wherein the first destination IP table comprises at least one IP address having a risk of being attacked, the dedicated security chip is further configured to send the first traffic to the CPU in response to a determination that the first IP address exists in the first destination IP table, the dedicated security chip is further configured to: in response to a determination that the first IP address does not exist in the first destination IP table, sample the first traffic to obtain sampled packets, and send the sampled packets to the CPU, the CPU is configured to: perform attack detection on the first traffic sent by the dedicated security chip, and send traffic on which attack detection is performed to the second network interface, and the second network interface is configured to forward the traffic on which attack detection is performed to a second network device.

16. The protection device according to claim 15, wherein in response to a determination that the first IP address does not exist in the first destination IP table, the dedicated security chip is further configured to send the first traffic to the second network interface; and the second network interface is further configured to forward the first traffic to the second network device.

17. The protection device according to claim 15, wherein the CPU is further configured to determine, based on the first traffic, a rate of data destined for the first IP address; and the CPU is further configured to:

in response to a determination that a duration in which the rate exceeds a first threshold is greater than a first duration, generate a first addition message and send the first addition message to the dedicated security chip, wherein the dedicated security chip is further configured to add the first IP address to the first destination IP table based on the first addition message from the CPU, and the first addition message comprises a request to add the first IP address to the first destination IP table; or in response to a determination that a duration in which the rate is lower than the first threshold is greater than a second duration, generate a first deletion message and send the first deletion message to the dedicated security chip, wherein the dedicated security chip is further configured to delete the first IP address from the first destination IP table based on the first deletion message from the CPU, and the first deletion message comprises a request to delete the first IP address from the first destination IP table.

18. The protection device according to claim 17,
wherein the CPU is configured to determine, based on the sampled packets, the rate of the data destined for the first IP address.

19. The protection device according to claim 18, wherein:
the dedicated security chip is configured to select the sampled packets from the first traffic based on a sampling ratio, wherein the sampling ratio indicates a ratio of a quantity of packets comprised in the first traffic to a quantity of the sampled packets; and
the CPU is configured to determine, based on a rate at which the sampled packets are received and the sampling ratio, the rate of the data destined for the first IP address.

20. The protection device according to claim 15, wherein the dedicated security chip comprises at least one of an application-specific integrated circuit (ASIC), ASIC, a field programmable gate array (FPGA), or a network processor (NP).

* * * * *